(12) United States Patent
Hu et al.

(10) Patent No.: US 12,477,610 B2
(45) Date of Patent: *Nov. 18, 2025

(54) LINK RE-ESTABLISHMENT METHOD, APPARATUS, AND SYSTEM

(71) Applicant: HUAWEI TECHNOLOGIES CO., LTD., Shenzhen (CN)

(72) Inventors: Li Hu, Shenzhen (CN); Jing Chen, Shenzhen (CN); Yinghui Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/440,598

(22) Filed: Feb. 13, 2024

(65) Prior Publication Data

US 2024/0267973 A1 Aug. 8, 2024

Related U.S. Application Data

(63) Continuation of application No. 16/455,739, filed on Jun. 27, 2019, now Pat. No. 11,943,830, which is a
(Continued)

(30) Foreign Application Priority Data

Dec. 30, 2016 (WO) ................ PCT/CN2016/113854

(51) Int. Cl.
  *H04W 76/19* (2018.01)
  *H04W 8/08* (2009.01)
  (Continued)

(52) U.S. Cl.
  CPC ............. *H04W 76/19* (2018.02); *H04W 8/08* (2013.01); *H04W 76/25* (2018.02); *H04W 76/27* (2018.02); *H04W 80/02* (2013.01)

(58) Field of Classification Search
  CPC ....... H04W 76/19; H04W 8/08; H04W 76/25; H04W 76/27; H04W 80/02; H04W 12/72;
  (Continued)

(56) References Cited

U.S. PATENT DOCUMENTS

2008/0188223 A1 8/2008 Vesterinen et al.
2009/0061878 A1 3/2009 Fischer
(Continued)

FOREIGN PATENT DOCUMENTS

CN 101483516 A 7/2009
CN 101754413 A 6/2010
(Continued)

OTHER PUBLICATIONS

U.S. Appl. No. 16/455,739, filed Jun. 27, 2019.
(Continued)

*Primary Examiner* — Thinh D Tran
(74) *Attorney, Agent, or Firm* — Leydig, Voit & Mayer, Ltd.

(57) ABSTRACT

A link re-establishment method, an apparatus, and a system are described. The method includes: obtaining, by user equipment UE, a MAC of the UE based on a NAS integrity key and a first MAC generation parameter, where the first MAC generation parameter includes an identifier of the UE; sending, by the UE, a re-establishment request message to a target RAN, where the re-establishment request message includes the MAC and the first MAC generation parameter; and receiving, by the UE, a re-establishment response message of the target RAN. The UE triggers, by sending the re-establishment request message, a CP functional entity to perform authentication on the UE. The method and apparatus of the present disclosure address a problem that an excessively long time is consumed to re-establish a connection to a target RAN by using an RAU procedure, increases
(Continued)

a speed of re-establishing a connection between UE and a network, and improves user experience.

18 Claims, 16 Drawing Sheets

Related U.S. Application Data continuation of application No. PCT/CN2017/072511, filed on Jan. 24, 2017.

(51) Int. Cl.
*H04W 76/25* (2018.01)
*H04W 76/27* (2018.01)
*H04W 80/02* (2009.01)

(58) Field of Classification Search
CPC ..... H04W 12/06; H04W 12/10; H04W 76/00; H04W 12/106
See application file for complete search history.

(56) References Cited

U.S. PATENT DOCUMENTS

| | | |
|---|---|---|
| 2011/0269426 A1 | 11/2011 | Hultin et al. |
| 2011/0294508 A1 | 12/2011 | Min et al. |
| 2012/0202491 A1 | 8/2012 | Fox et al. |
| 2013/0260810 A1 | 10/2013 | Rayavarapu |
| 2013/0305386 A1 | 11/2013 | Zhang et al. |
| 2014/0204733 A1* | 7/2014 | Takahashi ............. H04W 36/36 370/225 |
| 2014/0220974 A1 | 8/2014 | Hsu |
| 2015/0215953 A1 | 7/2015 | Wang et al. |
| 2016/0007255 A1 | 1/2016 | Sharma et al. |
| 2016/0088540 A1 | 3/2016 | Wang et al. |
| 2016/0227403 A1 | 8/2016 | Narasimha et al. |
| 2016/0227410 A1 | 8/2016 | Narasimha et al. |
| 2016/0374000 A1* | 12/2016 | Kim ............. H04W 36/008375 |
| 2018/0132293 A1* | 5/2018 | Escott ............... H04W 36/0079 |
| 2018/0295659 A1* | 10/2018 | Shan ....................... H04W 4/24 |
| 2019/0174367 A1 | 6/2019 | Sharma |

FOREIGN PATENT DOCUMENTS

| | | | |
|---|---|---|---|
| CN | 102348201 A | 2/2012 | |
| CN | 103026753 A | 4/2013 | |
| CN | 103634914 A | 3/2014 | |
| JP | 2010004503 A | 1/2010 | |
| JP | 2010141613 A | 6/2010 | |
| KR | 20150020177 A | 2/2015 | |
| KR | 20160073962 A | 6/2016 | |
| WO | 2012097723 A1 | 7/2012 | |
| WO | WO-2014194457 A1 * | 12/2014 | ........ H04W 36/0016 |
| WO | 2015020804 A2 | 2/2015 | |

OTHER PUBLICATIONS

"3rd Generation Partnership Project; Technical Specification Group Services and System Aspects; 3GPP System Architecture Evolution (SAE); Security architecture(Release 14)," 3GPP TS 33.401 V14.1.0, pp. 1-152, 3rd Generation Partnership Project, Valbonne, France (Dec. 2016).

"3rd Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2 (Release 14)," 3GPP TS 36.300 V14.0.0, 3rd Generation Partnership Project, Valbonne, France, pp. 1-314 (Sep. 2016).

"3rd Generation Partnership Project; Technical Specification Group Radio Access Network; Evolved Universal Terrestrial Radio Access Network (E-UTRAN); S1 Application Protocol (S1AP)(Release 14)," 3GPP TS 36.413 V14.0.0, pp. 1-333, 3rd Generation Partnership Project, Valbonne, France (Sep. 2016).

"3rd Generation Partnership Project; Technical Specification Group Services and System Aspects; 3GPP System Architecture Evolution (SAE); Security architecture (Release 12)," 3GPP TS 33.401 V12.14.0, pp. 1-131, 3rd Generation Partnership Project, Valbonne, France (Mar. 2015).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.1.0, pp. 1-654, 3rd Generation Partnership Project, Valbonne, France (Dec. 2016).

"3rd Generation Partnership Project; Technical Specification Group Services and System Aspects; Study on architecture enhancements for Cellular Internet of Things (Release 13)," 3GPP TR 23.720 V13.0.0, pp. 1-97, 3rd Generation Partnership Project, Valbonne, France (Mar. 2016).

"Inter-eNB connected mobility for NB-IOT UE using CIoT EPS CP optimisation," 3GPP TSG-RAN WG2 #95, Gothenburg, Sweden, R2-164999, pp. 1-4, 3rd Generation Partnership Project, Valbonne, France (Aug. 22-26, 2016).

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.4.0, pp. 1-334, 3rd Generation Partnership Project, Valbonne, France (Sep. 2015).

* cited by examiner

LINK RE-ESTABLISHMENT METHOD, APPARATUS, AND SYSTEM

CROSS-REFERENCE TO RELATED APPLICATIONS

This application is a continuation of U.S. patent application Ser. No. 16/455,739, filed on Jun. 27, 2019, which is a continuation of International Application No. PCT/CN2017/072511, filed on Jan. 24, 2017, which claims priority to International Application No. PCT/CN2016/113854, filed on Dec. 30, 2016. All of the afore-mentioned patent applications are hereby incorporated by reference in their entireties.

TECHNICAL FIELD

The present disclosure relates to mobile communications technologies, and in particular, to a link re-establishment method, an apparatus, and a system.

BACKGROUND

The 3rd Generation Partnership Project (3GPP) is developing a Narrowband Internet of Things (NB-IoT) project research, to support an Internet of Things device of extremely low complexity, a limited power, and a low data rate by enhancing an overall architecture.

User equipment (UE) such as a water meter, an electricity meter, or a sensor mainly sends meter reading data or monitoring data of a small volume, for example, usually sends data of only a few tens to hundreds of bytes, and sends data at large intervals. Therefore, to avoid a transmission resource waste, a data packet of the UE is encapsulated into a non-access stratum (NAS) message, and the UE sends the NAS message to a radio access node (RAN) by using a radio resource control (RRC) message, and then the RAN sends the NAS message to a control plane (CP) functional entity of a core network. The CP functional entity does not establish a bearer for the NAS message, but directly transmits the NAS message to a user plane (UP) functional entity of the core network, without performing cumbersome signaling interaction.

In the foregoing transmission manner, when an RRC connection between the UE and the RAN encounters a fault, for example, a radio link failure (RLF) caused by a weak signal between the UE and the current RAN, the UE connects to an RAN of a stronger signal, and re-establishes a connection to the CP functional entity by using a tracking area update (TAU) procedure. Specifically, when the UE detects an RLF, the UE re-enters an idle state, and then the UE re-establishes a connection to the CP functional entity by using the tracking area update (TAU) procedure. In the foregoing process, a signaling interaction procedure is complex, and consumes a long time and a great amount of power. In addition, because the UE directly disconnects from a source RAN, a data packet loss may be caused, affecting service continuity.

SUMMARY

Embodiments of the present disclosure provide a link re-establishment method, an apparatus, and a system, so as to implement quick re-establishment of a link between UE and a target RAN.

According to a first aspect, a link re-establishment method is provided, where the method includes: obtaining, by UE, a MAC of the UE based on a non-access stratum NAS integrity key and a first message authentication code MAC generation parameter, where the first MAC generation parameter includes an identifier of the UE; sending, by the UE, a re-establishment request message to a target radio access node RAN, where the re-establishment request message includes the MAC and the first MAC generation parameter; and receiving, by the UE, a re-establishment response message of the target RAN. The UE sends the re-establishment request message to the target RAN, so that the target RAN sends a second MAC generation parameter and the MAC to a CP functional entity based on the re-establishment request message, and then the CP functional entity verifies the MAC based on the received information, thereby implementing authentication on the UE, and ensuring network security. In addition, the UE triggers, by sending the re-establishment request message, the CP functional entity to perform authentication on the UE. This resolves a prior-art problem that an excessively long time is consumed to re-establish a connection to the RAN by using an RAU procedure, increases a speed of re-establishing a connection between UE and a network, and improves user experience.

According to a second aspect, a link re-establishment method is provided, including: receiving, by a target RAN, a re-establishment request message sent by UE, where the re-establishment request message includes a MAC of the UE and a first MAC generation parameter, and the first MAC generation parameter includes an identifier of the UE; sending, by the target RAN, a first message to a source RAN based on the re-establishment request message, where the first message includes a second MAC generation parameter and the MAC; and receiving, by the target RAN, a context of the UE sent by the source RAN, and sending a re-establishment response message to the UE. The target RAN sends the second MAC generation parameter and the MAC to a CP functional entity based on the re-establishment request message sent by the UE, so that the CP functional entity verifies integrity of the MAC based on the received information, to implement validity verification on the re-establishment request message. This prevents the re-establishment request message from being forged, tampered, or replayed, and ensures network security. In addition, when verification of the MAC succeeds, the target RAN receives the context of the UE sent by the source RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

With reference to the second aspect, in a first implementation of the second aspect, the second MAC generation parameter is the same as the first MAC generation parameter, or the second MAC generation parameter includes the first MAC generation parameter and a target physical cell identifier PCI of the UE.

With reference to the second aspect or the first implementation of the second aspect, in a second implementation of the second aspect, the re-establishment request message further includes a source PCI of the UE; or the first MAC generation parameter includes the source PCI of the UE.

With reference to any one of the foregoing first aspect, the second aspect, or the foregoing implementations of the second aspect, the first MAC generation parameter includes at least one of a NAS parameter and an RRC parameter. The NAS parameter may be a NAS count, and the RRC parameter may be the source PCI of the UE.

According to a third aspect, a link re-establishment method is provided, including: receiving, by a source RAN, a first message sent by a target RAN, where the first message includes a MAC of UE and a second MAC generation parameter, and the second MAC generation parameter includes an identifier of the UE; sending, by the source RAN, a second message to a control plane functional entity based on the first message, where the second message includes the second MAC generation parameter and the MAC; receiving, by the source RAN, a verification result, sent by the control plane functional entity, of the MAC; and when the verification result indicates that verification of the MAC succeeds, sending, by the source RAN, a context of the UE to the target RAN. When determining, based on the verification result, sent by the CP functional entity, of the MAC, that verification of the MAC succeeds, the source RAN sends the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

With reference to the third aspect, in a first implementation of the third aspect, the method further includes: sending, by the source RAN, data of the UE stored on the source RAN to the control plane functional entity.

According to a fourth aspect, a link re-establishment method is provided, including: receiving, by a control plane functional entity, a second message sent by a source radio access node RAN, where the second message includes a message authentication code MAC of user equipment UE and a second MAC generation parameter, and the second MAC generation parameter includes an identifier of the UE; verifying, by the control plane functional entity, the MAC based on the second message; and sending, by the control plane functional entity, a verification result of the MAC to the source RAN. The CP functional entity verifies the MAC, to implement validity verification on a re-establishment request message by verifying integrity of the MAC. This prevents the re-establishment request message from being forged, tampered, or replayed, and ensures network security. In addition, the CP functional entity sends the verification result of the MAC to the source RAN, and triggers the source RAN to send a context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

With reference to the fourth aspect, in a first implementation of the fourth aspect, the verifying, by the control plane functional entity, the MAC based on the second message includes: obtaining, by the control plane functional entity, a non-access stratum NAS integrity key of the UE based on the second message; and verifying, by the control plane functional entity, the MAC based on the NAS integrity key and the second MAC generation parameter.

According to a fifth aspect, a link re-establishment method is provided, including: receiving, by a target RAN, a re-establishment request message sent by UE, where the re-establishment request message includes a MAC of the UE and a first MAC generation parameter, and the first MAC generation parameter includes an identifier of the UE; sending, by the target RAN, a third message to a control plane functional entity based on the re-establishment request message, where the third message includes a second MAC generation parameter and the MAC; receiving, by the target RAN, a context of the UE; and sending, by the target RAN, a re-establishment response message to the UE based on the context of the UE. The target RAN receives the first MAC generation parameter and the MAC that are sent by the UE, and sends the second MAC generation parameter and the MAC to the CP functional entity, so that the CP functional entity verifies the MAC, thereby ensuring network security. In addition, after verification of the MAC succeeds, the target RAN receives the context of the UE sent by the source RAN or the CP functional entity. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

With reference to the fifth aspect, in a first implementation of the fifth aspect, the second MAC generation parameter is the same as the first MAC generation parameter, or the second MAC generation parameter includes the first MAC generation parameter and a target physical cell identifier PCI of the UE.

With reference to the fifth aspect or the first implementation of the fifth aspect, in a second implementation of the fifth aspect, the first MAC generation parameter includes a non-access stratum NAS parameter. The NAS parameter may include a NAS count.

With reference to the fifth aspect, or the first or the second implementation of the fifth aspect, in a third implementation of the fifth aspect, the sending, by the target RAN, a third message to a control plane functional entity based on the re-establishment request message includes: obtaining, by the target RAN, an identifier of the control plane functional entity based on an identifier of the UE; and sending, by the target RAN, the third message to the control plane functional entity based on the identifier of the control plane functional entity.

With reference to any one of the fifth aspect or the foregoing implementations of the fifth aspect, in a fourth implementation of the fifth aspect, the receiving, by the target RAN, a context of the UE includes: receiving, by the target RAN, the context of the UE sent by the control plane functional entity; or receiving, by the target RAN, the context of the UE sent by the source RAN.

With reference to the fourth implementation of the fifth aspect, in a fifth implementation of the fifth aspect, before the receiving, by the target RAN, the context of the UE sent by the source RAN, the method further includes: receiving, by the target RAN, a fourth message sent by the control plane functional entity, where the fourth message includes the identifier of the UE, a token of the source RAN, and an identifier of the source RAN; and sending, by the target RAN, the token and the identifier of the UE to the source RAN based on the identifier of the source RAN.

According to a sixth aspect, a link re-establishment method is provided, including: receiving, by a source RAN, an identifier of UE and a token of the source RAN that are sent by a target RAN; and when a token stored on the source RAN is the same as the token sent by the target RAN, sending, by the source RAN, a context of the UE to the target RAN. After verification of the token succeeds, the source RAN directly sends the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to a CP functional entity, reduces power consumption of the UE, and improves user experience. In addition, verification of the token ensures network security.

With reference to the sixth aspect, in a first implementation of the sixth aspect, the method further includes: when a token stored on the source RAN is the same as the token sent by the target RAN, sending, by the source RAN, data of the UE stored on the source RAN to the control plane functional entity.

According to a seventh aspect, a link re-establishment method is provided, including: receiving, by a source RAN, a fifth message sent by a control plane functional entity, where the fifth message includes an identifier of user equipment UE; and deleting, by the source RAN, a context of the UE based on the identifier of the UE.

With reference to the seventh aspect, in a first implementation of the seventh aspect, the fifth message is used to request the source RAN to send data of the UE to a control plane functional entity, and the method further includes: sending, by the source RAN, the data of the UE stored on the source RAN to the control plane functional entity.

According to an eighth aspect, a link re-establishment method is provided, including: receiving, by a control plane functional entity, a third message sent by a target RAN, where the third message includes a MAC of UE and a second MAC generation parameter, and the second MAC generation parameter includes an identifier of the UE; verifying, by the control plane functional entity, the MAC based on the third message; and when verification of the MAC succeeds, sending, by the control plane functional entity, a context of the UE or a fourth message to the target RAN, where the fourth message includes the identifier of the UE, a token of the source RAN, and an identifier of the source RAN. The CP functional entity verifies the MAC based on the second MAC generation parameter, to implement validity verification on a re-establishment request message. This prevents the re-establishment request message from being forged, tampered, or replayed, and ensures network security. In addition, the CP functional entity sends the context of the UE to the target RAN after verification of the MAC succeeds, or the CP functional entity sends the fourth message to the target RAN after verification of the MAC succeeds, so that the target RAN sends the token to the source RAN, and then the source RAN sends the context of the UE to the target RAN after verification of the token succeeds. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

With reference to the eighth aspect, in a first implementation of the eighth aspect, the method further includes: when verification of the MAC succeeds, sending, by the control plane functional entity, a fifth message to the source RAN, where the fifth message includes the identifier of the UE.

With reference to the first implementation of the eighth aspect, in a second implementation of the eighth aspect, the fifth message is used to request the source RAN to send data of the UE to the control plane functional entity.

With reference to any one of the eighth aspect or the foregoing implementations of the eighth aspect, in a third implementation of the eighth aspect, the method further includes: receiving, by the control plane functional entity, the data of the UE sent by the source RAN.

With reference to any one of the eighth aspect or the foregoing implementations of the eighth aspect, in a fourth implementation of the eighth aspect, the second MAC generation parameter further includes a NAS parameter; or the second MAC generation parameter further includes the NAS parameter and a target physical cell identifier PCI of the UE. The NAS parameter may be a NAS count.

With reference to any one of the fifth aspect, the sixth aspect, the seventh aspect, the eighth aspect, or the implementations of the foregoing aspects, the identifier of the UE includes at least one of an SAE-temporary mobile subscriber identity S-TMSI and a globally unique temporary identity GUTI.

According to a ninth aspect, UE is provided, including: a processing unit, configured to obtain a MAC of the UE based on a NAS integrity key and a first message authentication code MAC generation parameter, where the first MAC generation parameter includes an identifier of the UE; and a transceiver unit, configured to send a re-establishment request message to a target radio access node RAN, where the re-establishment request message includes the MAC and the first MAC generation parameter, where the transceiver unit is further configured to receive a re-establishment response message of the target RAN.

According to a tenth aspect, a target RAN is provided, including: a first receiving unit, configured to receive a re-establishment request message sent by UE, where the re-establishment request message includes a MAC of the UE and a first MAC generation parameter, and the first MAC generation parameter includes an identifier of the UE; a sending unit, configured to send a first message to a source RAN based on the re-establishment request message received by the first receiving unit, where the first message includes a second MAC generation parameter and the MAC; and a second receiving unit, configured to: receive a context of the UE sent by the source RAN, and send a re-establishment response message to the UE by using the sending unit.

With reference to the tenth aspect, in a first implementation of the tenth aspect, the second MAC generation parameter is the same as the first MAC generation parameter, or the second MAC generation parameter includes the first MAC generation parameter and a target physical cell identifier PCI of the UE.

According to an eleventh aspect, a source RAN is provided, including: a receiving unit, configured to receive a first message sent by a target RAN, where the first message includes a MAC of UE and a second MAC generation parameter, and the second MAC generation parameter includes an identifier of the UE; a first sending unit, configured to send a second message to a control plane functional entity based on the first message received by the receiving unit, where the second message includes the second MAC generation parameter and the MAC, where the receiving unit is further configured to receive a verification result, sent by the control plane functional entity, of the MAC; and a second sending unit, configured to: when the verification result indicates that verification of the MAC succeeds, send a context of the UE to the target RAN.

With reference to the eleventh aspect, in a first implementation of the eleventh aspect, the first sending unit is further configured to send data of the UE stored on the source RAN to the control plane functional entity.

According to a twelfth aspect, a control plane functional entity is provided, including: a receiving unit, configured to receive a second message sent by a source RAN, where the second message includes a MAC of UE and a second MAC generation parameter, and the second MAC generation parameter includes an identifier of the UE; a verification unit, configured to verify the MAC based on the second message received by the receiving unit; and a sending unit, configured to send a verification result of the MAC to the source RAN.

With reference to the twelfth aspect, in a first implementation of the twelfth aspect, the verification unit is specifically configured to: obtain a NAS integrity key of the UE based on the second message; and verify the MAC based on the NAS integrity key and the second MAC generation parameter.

With reference to the twelfth aspect or the first implementation of the twelfth aspect, in a second implementation of the twelfth aspect, the second MAC generation parameter further includes at least one of a NAS parameter and an RRC parameter; or the second MAC generation parameter further includes at least one of the NAS parameter and the RRC parameter, and a target physical cell identifier PCI of the UE. The NAS parameter may include a NAS count.

With reference to any one of the twelfth aspect or the foregoing implementations of the twelfth aspect, in a third implementation of the twelfth aspect, the receiving unit is further configured to receive data of the UE sent by the source RAN, and the sending unit is further configured to send the data of the UE to the target RAN.

With reference to any one of the foregoing ninth aspect to twelfth aspect, or the foregoing implementations of the ninth aspect to the twelfth aspect, the identifier of the UE may include at least one of a source C-RNTI, an S-TMSI, and a GUTI.

According to a thirteenth aspect, a target RAN is provided, including: a first receiving unit, configured to receive a re-establishment request message sent by UE, where the re-establishment request message includes a MAC of the UE and a first MAC generation parameter, and the first MAC generation parameter includes an identifier of the UE; a sending unit, configured to send a third message to a control plane functional entity based on the re-establishment request message received by the first receiving unit, where the third message includes a second MAC generation parameter and the MAC; and a second receiving unit, configured to: receive a context of the UE, and send a re-establishment response message to the UE by using the sending unit. The target RAN sends the third message based on the received re-establishment request message sent by the UE.

With reference to the thirteenth aspect, in a first implementation of the thirteenth aspect, the second MAC generation parameter is the same as the first MAC generation parameter, or the second MAC generation parameter includes the first MAC generation parameter and a target physical cell identifier PCI of the UE.

With reference to any one of the thirteenth aspect or the foregoing implementations of the thirteenth aspect, in a third implementation of the thirteenth aspect, the first MAC generation parameter includes a NAS parameter. The NAS parameter may include a NAS count.

With reference to any one of the thirteenth aspect or the foregoing implementations of the thirteenth aspect, in a fourth implementation of the thirteenth aspect, the sending unit is specifically configured to: obtain an identifier of the control plane functional entity based on the identifier of the UE; and send the third message to the control plane functional entity based on the identifier of the control plane functional entity.

With reference to any one of the thirteenth aspect or the foregoing implementations of the thirteenth aspect, in a fifth implementation of the thirteenth aspect, the second receiving unit is specifically configured to receive the context of the UE sent by the control plane functional entity, or receive the context of the UE sent by a source RAN.

With reference to any one of the thirteenth aspect or the foregoing implementations of the thirteenth aspect, in a sixth implementation of the thirteenth aspect, the second receiving unit is further configured to receive a fourth message sent by the control plane functional entity, where the fourth message includes the identifier of the UE, a token of the source RAN, and an identifier of the source RAN; and the sending unit is further configured to send the token and the identifier of the UE to the source RAN based on the identifier of the source RAN received by the second receiving unit.

According to a fourteenth aspect, a source radio access node RAN is provided, including: a receiving unit, configured to receive an identifier of UE and a token of the source RAN that are sent by a target RAN; and a sending unit, configured to: when a token stored on the source RAN is the same as the token sent by the target RAN, send a context of the UE to the target RAN.

With reference to the fourteenth aspect, in a first implementation of the fourteenth aspect, the sending unit is further configured to: when the token stored on the source RAN is the same as the token sent by the target RAN, send data of the UE stored on the source RAN to a control plane functional entity.

According to a fifteenth aspect, a source RAN is provided, including a receiving unit, configured to receive a fifth message sent by a control plane functional entity, where the fifth message includes an identifier of UE; and a processing unit, configured to delete a context of the UE based on the identifier of the UE.

With reference to the fifteenth aspect, in a first implementation of the fifteenth aspect, the fifth message is used to request the source RAN to send data of the UE to a control plane functional entity, and the source RAN further includes a sending unit, where the sending unit is configured to: send the data of the UE stored on the source RAN to the control plane functional entity.

According to a sixteenth aspect, a control plane functional entity is provided, including: a receiving unit, configured to: receive a third message sent by a target RAN, where the third message includes a MAC of user equipment UE and a second MAC generation parameter, the second MAC generation parameter includes an identifier of the UE; a verification unit, configured to verify the MAC based on the third message received by the receiving unit; and a sending unit, configured to: when verification of the MAC succeeds, send a context of the UE or a fourth message to the target RAN, where the fourth message includes the identifier of the UE, a token of a source RAN, and an identifier of the source RAN.

With reference to the sixteenth aspect, in a first implementation of the sixteenth aspect, the sending unit is further configured to: when verification of the MAC succeeds, send a fifth message to the source RAN, where the fifth message includes the identifier of the UE.

With reference to the first implementation of the sixteenth aspect, in a second implementation of the sixteenth aspect, the fifth message is used to request the source RAN to send data of the UE to the control plane functional entity.

With reference to any one of the sixteenth aspect or the implementations of the sixteenth aspect, in a third implementation of the sixteenth aspect, the receiving unit is further configured to receive the data of the UE sent by the source RAN.

With reference to any one of the sixteenth aspect or the implementations of the sixteenth aspect, in a fourth implementation of the sixteenth aspect, the second MAC generation parameter further includes a NAS parameter; or the second MAC generation parameter further includes the NAS parameter and a target PCI of the UE. The NAS parameter may include a NAS count.

With reference to any one of the thirteenth aspect, the fourteenth aspect, the fifteenth aspect, the sixteenth aspect, or the implementations of the foregoing aspects, the identifier of the UE includes at least one of an S-TMSI and a GUTI.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

Figure 1:
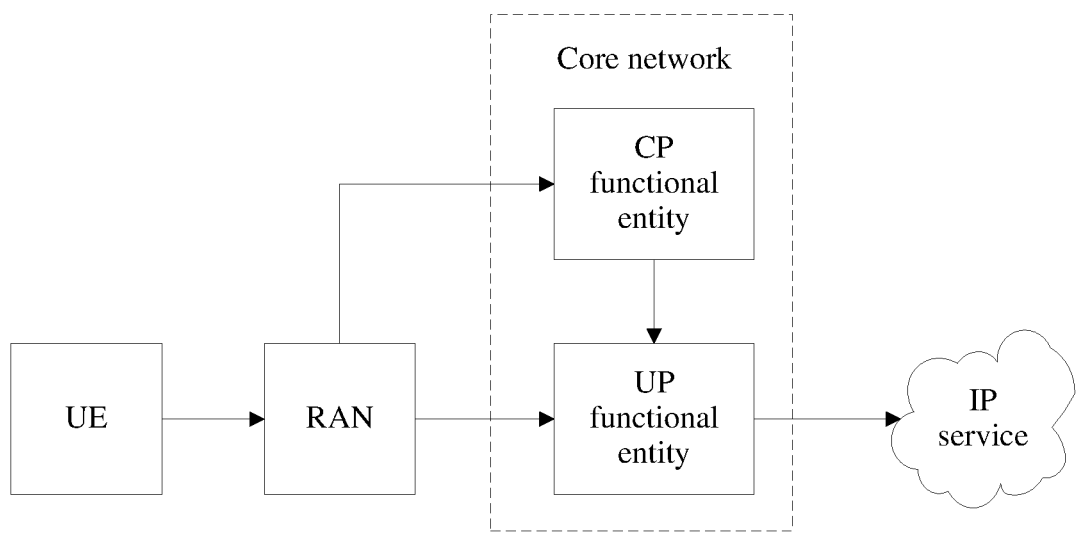
FIG. 1 is a structural diagram of a network.

FIG. 1 provides a network structure, and the network structure may be applied to a 4G or 5G system. Components in the network structure are briefly described as follows.

UE: It may include various handheld devices, in-vehicle devices, wearable devices, or computing devices that have a wireless communication function, or another processing device connected to a wireless modem, and UE, mobile stations (MS), terminals, terminal equipment, software terminals, and the like that are in various forms, such as a water meter, an electricity meter, or a sensor. For ease of description, in this disclosure, all the devices mentioned above are collectively referred to as user equipment or UE.

RAN: It is similar to a base station in a conventional network, provides a network access function for an authorized user in a specific area, and can use transmission tunnels of different quality based on a user level and a service requirement. The RAN can manage radio resources and provide an access service for UE as required, so as to forward a control signal and user data between the UE and a core network.

Core network: It is responsible for maintaining subscription data of a mobile network, managing network elements in the mobile network, and providing functions such as session management, mobility management, policy management, and security authentication for UE. When UE is attached to the core network, the core network provides network access authentication for the UE; when the UE requests a service, the core network allocates network resources to the UE; when the UE moves, the core network updates network resources for the UE; when the UE is idle, the core network provides a fast restoration mechanism for the UE; when the UE is detached from the core network, the core network releases network resources for the UE; when the UE has service data, the core network provides a data routing function for the UE, for example, receives downlink data of the UE from an IP network, and forwards the downlink data to an RAN, to send the downlink data to the UE.

In the network structure shown in FIG. 1, a core network includes a UP functional entity and a CP functional entity. Specifically, the UP functional entity is configured to implement a user plane function of the core network, and is mainly responsible for service data transmission, for example, data packet forwarding, quality of service (QOS) control, and charging information collection. The UP functional entity may include a serving gateway (SGW) or a packet data network gateway (PGW). The CP functional entity is configured to implement a control plane function of the core network, and is mainly responsible for mobile network management, for example, delivering of a data packet forwarding policy and a QoS control policy. The CP functional entity may specifically include a mobility management entity (MME), a session management entity, or the like. This is not specifically limited in the embodiments of this disclosure.

It should be noted that the CP functional entity and the UP functional entity may be implemented by one physical device, or may be jointly implemented by a plurality of physical devices. This is not specifically limited in the embodiments of this disclosure.

Certainly, the foregoing network structure may further include another module or network entity, such as a policy and charging rules function (olicy and Charging Rules Function, PCRF) entity, a policy and charging control (PCC) entity, and a policy control entity. Details are not described herein.

It should be noted that all the embodiments of the present disclosure are implemented based on the network architecture shown in FIG. 1. The UE and the CP functional entity that is in the core network transmit data of the UE by using a NAS message. In addition, "source" and "target" that are used are both for the UE. For example, a source RAN indicates an RAN to which the UE is currently connected, and a source PCI is used to indicate a cell to which the UE is currently connected. A target RAN indicates an RAN to which the UE attempts to re-connect after the UE disconnects from the source RAN, and a target PCI is used to indicate a cell to which the UE attempts to re-connect after the UE disconnects from the source RAN. Description herein is only an example, and no limitation is imposed in this disclosure.

It should be noted that, methods provided in the embodiments of the present disclosure may be performed when the UE detects a radio link failure, and no limitation is imposed on the embodiments.

Figure 2A:
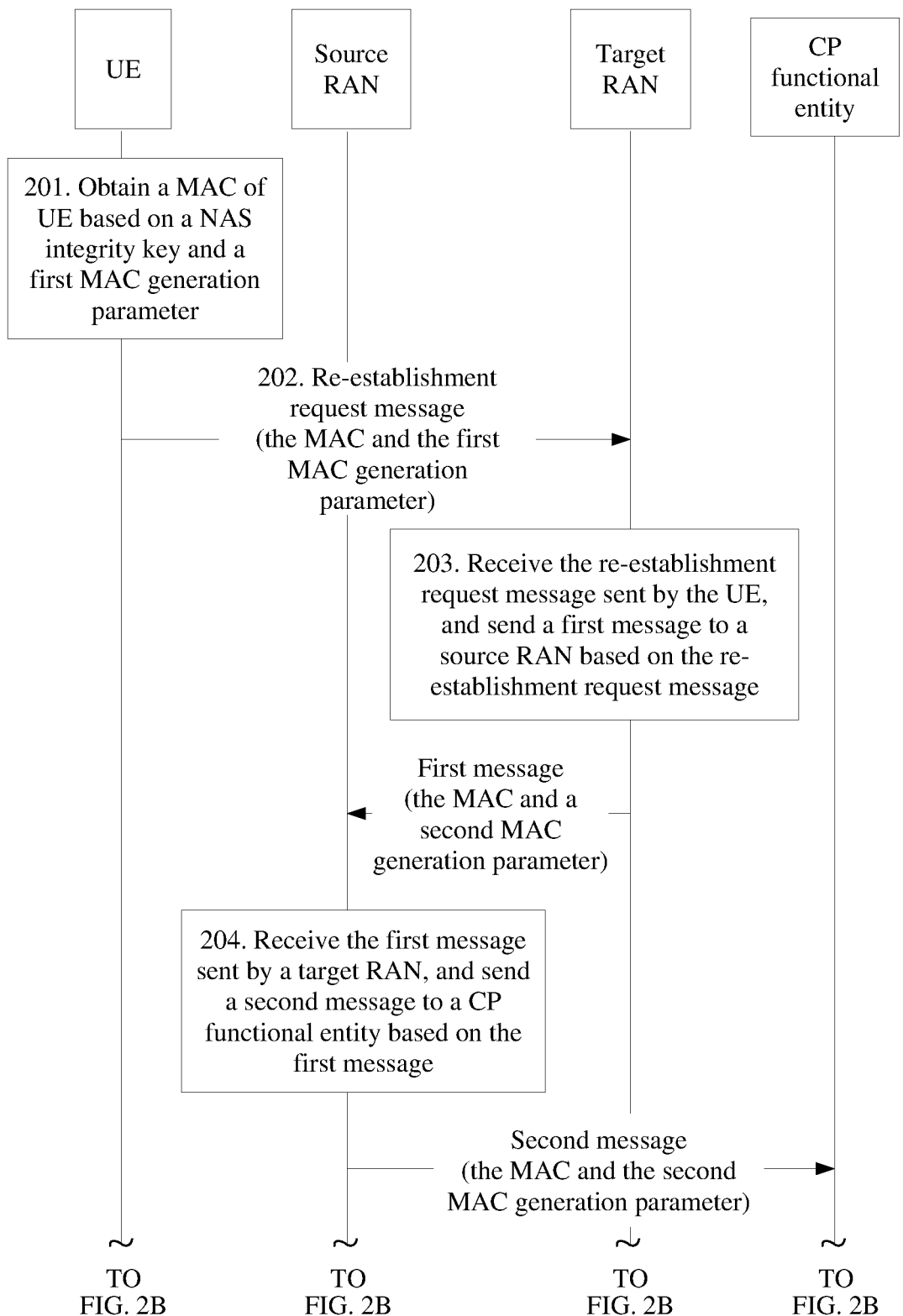
FIG. 2A and FIG. 2B are a flowchart of a link re-establishment method according to an embodiment of the present disclosure.
Figure 2B:
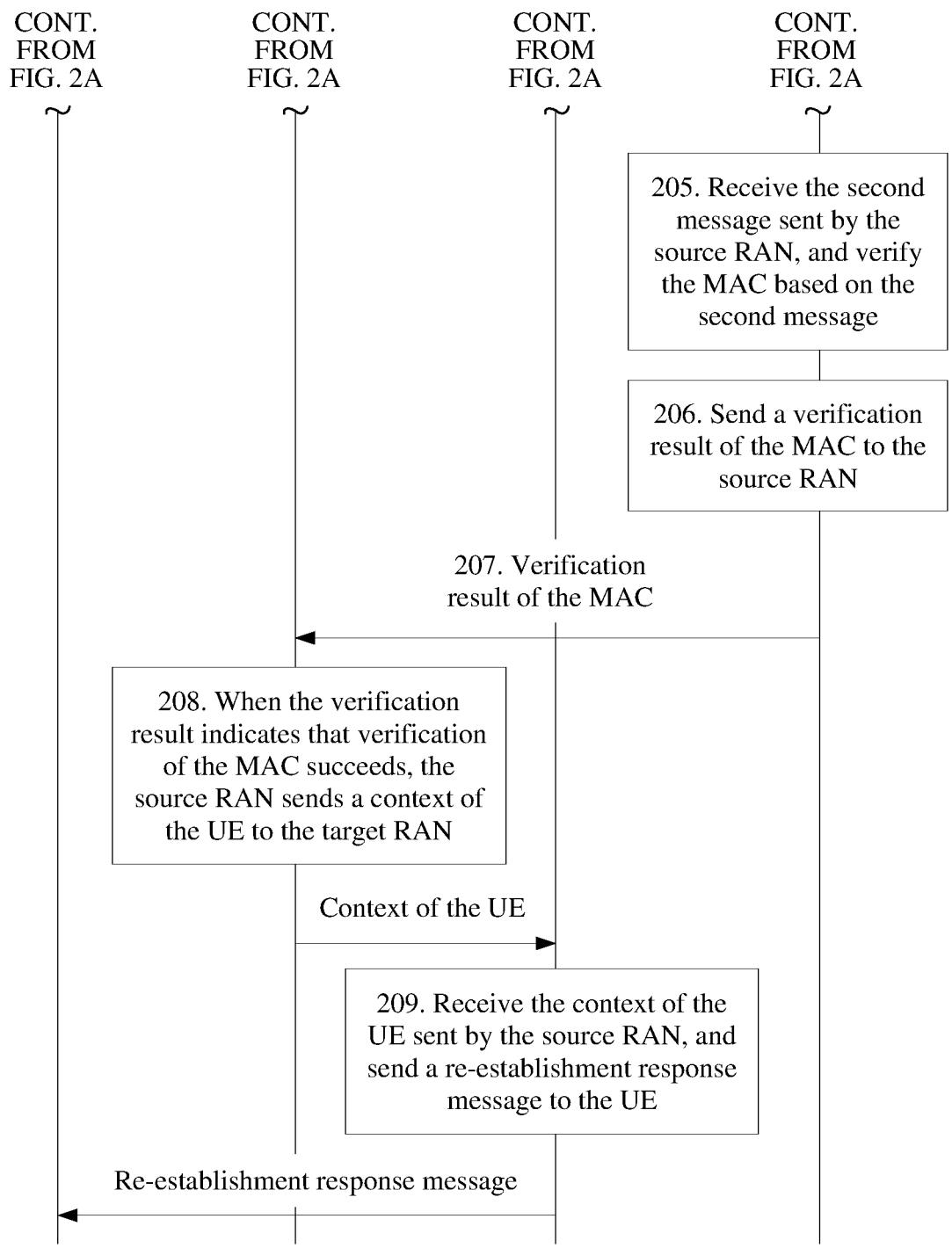

As shown in FIG. 2A and FIG. 2B, a link re-establishment method provided in an embodiment of the present disclosure is specifically described as follows.

201. UE obtains a MAC of the UE based on a NAS integrity key and a first MAC generation parameter.

The first MAC generation parameter is a parameter used to generate the MAC, and may include some parameters used to generate the MAC. For example, the MAC of the UE is generated by using a target PCI of the UE, an identifier of the UE, and a source PCI of the UE. In this case, the first MAC generation parameter may include only the identifier of the UE and the source PCI of the UE. The first MAC generation parameter may include all parameters used to generate the MAC except the NAS integrity key. This is not limited in this disclosure.

Specifically, the first MAC generation parameter includes the identifier of the UE, and the first MAC generation parameter may further include at least one of a NAS parameter and an RRC parameter that are of the UE. The RRC parameter may include the source physical cell identifier (physical cell identifier, PCI) of the UE and/or the target PCI of the UE, and the NAS parameter may include a NAS sequence number (NAS COUNT) of the UE. Apparently, the NAS parameter is not limited to the NAS count.

The NAS count is used to indicate a serial number of a NAS data packet, and the NAS count may include an uplink NAS count and a downlink NAS count. This belongs to the prior art, and details are not described.

The identifier of the UE may include at least one of a source cell radio network temporary identifier (C-RNTI), an SAE-temporary mobile subscriber identity (S-TMSI), and a globally unique temporary identity (GUTI). The source C-RNTI is allocated by the source RAN to the UE, and is used to uniquely identify the UE in the source RAN.

In addition, the identifier of the UE may be a partial field of the S-TMSI or a partial field of the GUTI. This is not limited herein.

It should be noted that step 201 may specifically include: obtaining the MAC of UE based on the NAS integrity key, the first MAC generation parameter, and the target PCI of the UE.

202. The UE sends a re-establishment request message to a target RAN, where the re-establishment request message includes the MAC and the first MAC generation parameter.

The re-establishment request message may be used to request to re-establish a connection between the UE and the target RAN, for example, an RRC connection, and the message may be specifically an RRC connection re-establishment request message.

The re-establishment request message carries the source PCI of the UE, and may specifically carry the source PCI of the UE in the following manners.

Manner 1: The re-establishment request message includes the source PCI of the UE. For example, the source PCI is carried in the re-establishment request message, and is independent of the first MAC generation parameter. In other words, the re-establishment request message includes the first MAC generation parameter, the MAC, and the source PCI.

Manner 2: The first MAC generation parameter includes the source PCI of the UE.

203. The target RAN receives the re-establishment request message sent by the UE, and sends a first message to a source RAN based on the re-establishment request message.

The first message includes a second MAC generation parameter and the MAC, and the first message may be a radio link failure (RLF) indication message.

The second MAC generation parameter may be the same as the first MAC generation parameter. Alternatively, the second MAC generation parameter may be different from the first MAC generation parameter. For example, the second MAC generation parameter includes the first MAC generation parameter and the target PCI of the UE. This may be specifically applied to a scenario in which the UE generates the MAC by using the target PCI of the UE, but the first MAC generation parameter does not include the target PCI of the UE.

To be specific, the second MAC generation parameter includes the identifier of the UE, and the second MAC generation parameter further includes: at least one of the NAS parameter and the RRC parameter; or at least one of the NAS parameter and the RRC parameter, and the target PCI of the UE.

Specifically, in step 203, the target RAN sends the first message to the source RAN based on the source PCI of the UE carried in the re-establishment request message. For example, a correspondence exists between a PCI and an identifier or an address of an RAN. The target RAN searches a correspondence by using the source PCI of the UE, to obtain an identifier or an address of the source RAN, and sends the first message to the source RAN based on the identifier or the address of the source RAN.

204. The source RAN receives the first message sent by the target RAN, and sends a second message to a CP functional entity based on the first message.

The second message includes the second MAC generation parameter and the MAC, and the second message may be sent through a connection link between the source RAN and the CP functional entity. This is not limited herein.

Specifically, in step 204, the source RAN may send the second message to the CP functional entity based on the identifier of the UE (UE ID) included in the first message, and step 204 may include: obtaining, by the source RAN, an identifier of a first link of the UE based on the identifier of the UE, where the first link is used to transmit data of the UE between the source RAN and the CP functional entity, and the source RAN sends the second message to the CP functional entity through the first link.

For example, when the identifier of the UE is a source C-RNTI, the source RAN finds the identifier of the first link by using the source C-RNTI, and the source RAN sends the second message to the CP functional entity through the first link indicated by the identifier. The first link may be an S1 connection link, and the identifier of the first link may be an MME UE S1 disclosure protocol ID (MME UE S1AP ID). The MME UE S1AP ID is allocated by an MME, and is used to identify an S1AP of the UE.

For another example, when the identifier of the UE is a GUTI, an S-TMSI, a partial field of the GUTI, or a partial field of the S-TMSI, the source RAN obtains an identifier of the CP functional entity from the identifier of the UE, for example, a globally unique MME identifier (GUMMEI). The source RAN sends the second message to the CP functional entity, or the source RAN finds the first link of the UE based on the identifier of the UE, and sends the second message to the CP functional entity through the first link. The first link may be an S1 connection link.

Generally, the source RAN stores related information of the UE based on the source C-RNTI of the UE, to be specific, the related information (for example, the first link) of the UE can be searched for and obtained in the source RAN by using the C-RNTI. When the identifier of the UE is the GUTI, the S-TMSI, the partial field of the GUTI, or the partial field of the S-TMSI, the source RAN may first store the identifier of the UE. For example, when the source RAN communicates with the CP functional entity, the source RAN receives the identifier of the UE sent by the CP functional entity, and associates the identifier of the UE with the related information of the UE. In this case, the source RAN may obtain the related information of the UE based on the identifier of the UE.

205. The CP functional entity receives the second message sent by the source RAN, and verifies the MAC based on the second message.

206. The CP functional entity sends a verification result of the MAC to the source RAN.

The verification result of the MAC may be sent to the source RAN in an explicit manner. Specifically, at least one bit may be used to indicate the verification result of the MAC. For example, when a value of the at least one bit is 1, it indicates that verification of the MAC succeeds, or when the value of the at least one bit is 0, it indicates that verification of the MAC fails. Apparently, the verification result of the MAC may further be sent to the source RAN in an implicit manner. Specifically, different message names may be used to notify the source RAN of the verification result of the MAC, and indication information may be sent to the source RAN only when verification of the MAC succeeds, and when verification of the MAC fails, the indication information is not sent to the source RAN.

In addition, the verification result of the MAC may be sent to the source RAN by using a UE verification response message.

207. The source RAN receives the verification result, sent by the CP functional entity, of the MAC.

208. When the verification result indicates that verification of the MAC succeeds, the source RAN sends a context of the UE to the target RAN.

The context of the UE may include an MME UE S1AP ID, a UE security capability (UE security capabilities), an E-UTRAN radio access bearer (E-RAB) ID, and an E-RAB level quality of service parameter (E-RAB Level QoS Parameters). The UE security capabilities are used to identify a security capability of the UE, the E-RAB ID is used to identify an E-RAB bearer, and the E-RAB level QoS parameters are used to identify parameters such as a bearer Qos.

In addition, the context of the UE may not include an access stratum (AS) security context, for example, a key KeNB*.

Specifically, the context may be a context of UE in a control plane CIoT EPS optimization solution. This is not limited herein.

Specifically, the context of the UE may be carried in a restoration UE context response (Retrieve UE Context Response) message.

209. The target RAN receives the context of the UE sent by the source RAN, and sends a re-establishment response message to the UE.

Correspondingly, the UE receives the re-establishment response message sent by the target RAN.

The re-establishment response message may be used to indicate that a link is allowed to be re-established between the UE and the target RAN. The re-establishment response message may further be used to indicate that the authentication performed by the CP functional entity on the UE succeeds, and may further be used to indicate that the identifier of the UE exists in the CP functional entity. When the re-establishment request message is an RRC connection re-establishment request, the re-establishment response message may be an RRC connection re-establishment message. After receiving the RRC connection re-establishment message, the UE may send an RRC connection re-establishment complete message to the target RAN. The RRC connection re-establishment complete message may be used to indicate that establishment of an RRC connection between the target RAN and the UE is completed.

It should be noted that when the target RAN receives the context of the UE sent by the source RAN, it indicates that verification performed by the CP functional entity on the MAC sent by the UE succeeds, in other words, authentication performed by the CP functional entity on the UE succeeds.

In the method provided in the foregoing embodiment, the UE sends, to the target RAN, the re-establishment request message that includes the first MAC generation parameter and the MAC, and the target RAN sends the second MAC generation parameter and the MAC to the CP functional entity based on the re-establishment request message and by using the source RAN, so that the CP functional entity verifies the MAC based on the second MAC generation parameter, and sends the verification result to the source RAN. When verification of the MAC succeeds, the source RAN sends the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience. In addition, the CP functional entity verifies integrity of the MAC, to implement validity verification on the re-establishment request message. This prevents the re-establishment request message from being forged, tampered, or replayed, and ensures network security.

Optionally, in an implementation scenario of the foregoing embodiment, step 201 may include the following steps.

2011. Calculate a hash value based on the first MAC generation parameter.

Specifically, the first MAC generation parameter is combined into a message, and the combined message is used as an input of a hash function, to obtain the hash value Hm. For example, the following formula is used:

$$Hm=\text{HASH}(message), \text{ where} \qquad \text{(formula 1)}$$

Hm is a hash value, HASH is a hash function, and message is an input message.

2012. Calculate the MAC based on the NAS integrity key and the hash value Hm.

Specifically, the MAC may be calculated by using the following formula:

$$MAC=\text{Enc}(Hm,\text{Kint}), \text{ where} \qquad \text{(formula 2)}$$

Enc is an encryption function, Hm is a hash value, and Kint is a NAS integrity key.

For example, when the first MAC generation parameter includes the NAS parameter, if the NAS parameter is a NAS count, the combined message in step 2011 includes a NAS count or a partial field of the NAS count (least significant four bits of the NAS count), and the identifier of the UE, the combined message may further include a preset constant value. The preset constant value is stored on the UE. In addition, the preset constant value is also stored on the CP functional entity.

It should be noted that when the target PCI of the UE is also used to generate the MAC, the combined message in step 2011 includes the first MAC generation parameter and the target PCI of the UE. Details are not described herein.

Optionally, in another implementation scenario of the foregoing embodiment, step 205 may include the following steps.

2051. The CP functional entity obtains the NAS integrity key of the UE based on the second message.

For example, the CP functional entity may obtain, through the first link that is used to receive the second message, the identifier of the UE corresponding to the first link. For the first link, refer to description in step 204. Then the CP functional entity searches for a stored NAS context of the UE based on the identifier of the UE, to obtain the NAS integrity key of the UE.

For another example, when the second message includes the identifier of the UE, and the identifier of the UE is the GUTI, the S-TMSI, the partial field of the GUTI, or the partial field of the S-TMSI, the CP functional entity may further search for the stored NAS context of the UE based on the identifier of the UE, so as to obtain the NAS integrity key of the UE.

2052. The CP functional entity verifies the MAC based on the NAS integrity key and the second MAC generation parameter.

Specifically, the CP functional entity obtains the hash value Hm based on the second MAC generation parameter, the NAS integrity key, and the foregoing formula 1, and obtains a hash value Hm' based on the MAC, the NAS integrity key, and a formula 3, and compares Hm with Hm'. If Hm and Hm' are different, verification of the MAC fails; or if Hm and Hm' are the same, verification of the MAC succeeds.

$$Hm'=\text{Dec}(MAC,\text{Kint}), \text{ where} \qquad \text{(formula 3)}$$

Dec is a decryption function, and Kint is a NAS integrity key.

In addition, when the second MAC generation parameter includes a NAS count, the NAS count in the second MAC generation parameter and the NAS count of the UE stored on the CP functional entity may be compared before Hm and Hm' are compared. Apparently, when the second MAC generation parameter includes a partial field of the NAS count, the partial field of the NAS count in the second MAC generation parameter may be compared with a corresponding partial field of the NAS count of the UE stored on the CP functional entity. If the partial field of the NAS count in the second MAC generation parameter is the same as the corresponding partial field of the NAS count of the UE stored on the CP functional entity, Hm and Hm' are obtained, and Hm and Hm' are compared. This is not limited herein.

In the method provided in the foregoing implementation scenario, the CP functional entity verifies the integrity of the MAC, to implement validity verification on the re-establishment request message. This prevents the re-establishment request message from being forged, tampered, or replayed, and ensures network security.

Optionally, in still another implementation scenario of the foregoing embodiment, the foregoing method further includes the following steps.

210. The source RAN sends data of the UE stored on the source RAN to the CP functional entity.

211. The CP functional entity receives the data of the UE sent by the source RAN, and sends the received data of the UE to the UE by using the target RAN.

For example, the CP functional entity sends a downlink NAS packet data unit (PDU) to the target RAN.

In the method provided in the foregoing embodiment scenario, the source RAN sends the received data of the UE to the target RAN by using the CP functional entity, and then the target RAN sends the received data of the UE to the UE. This avoids a loss of the data of the UE, improves data transmission efficiency, and enhances network transmission reliability.

Optionally, in yet another implementation scenario of the foregoing embodiment, the foregoing method further includes: updating, by the CP functional entity, the identifier of the UE, and sending an updated identifier of the UE to the target RAN.

Optionally, steps 208 and 209 in the foregoing embodiment may be replaced with step 208' as follows.

208'. When the verification result received by the source RAN in step 207 indicates that verification of the MAC fails, the source RAN sends, to the target RAN, a message used to indicate a re-establishment failure.

The message in step 208' may carry a failure cause value, so that the target RAN sends the failure cause value to the UE. Specifically, the failure cause value may be at least one bit, and is used to indicate a cause of the link re-establishment failure, for example, a MAC verification failure.

Step 208' may be used to notify the UE of the cause of the link re-establishment failure, so that the UE can learn the failure cause and adjust an access policy in a timely manner.

Optionally, in still yet another implementation scenario of the foregoing embodiment, step 208 may further include: sending, by the source RAN, the data of the UE stored on the source RAN to the target RAN.

Correspondingly, the foregoing method further includes: receiving, by the target RAN, the data of the UE sent by the source RAN.

Specifically, the data of the UE may be sent by using the NAS PDU, and details are not described again.

In the foregoing implementation scenario, the source RAN directly sends the data of the UE to the target RAN. This shortens a transmission path of the data of the UE, avoids a waste of transmission resources in the core network, and improves performance.

Figure 3:
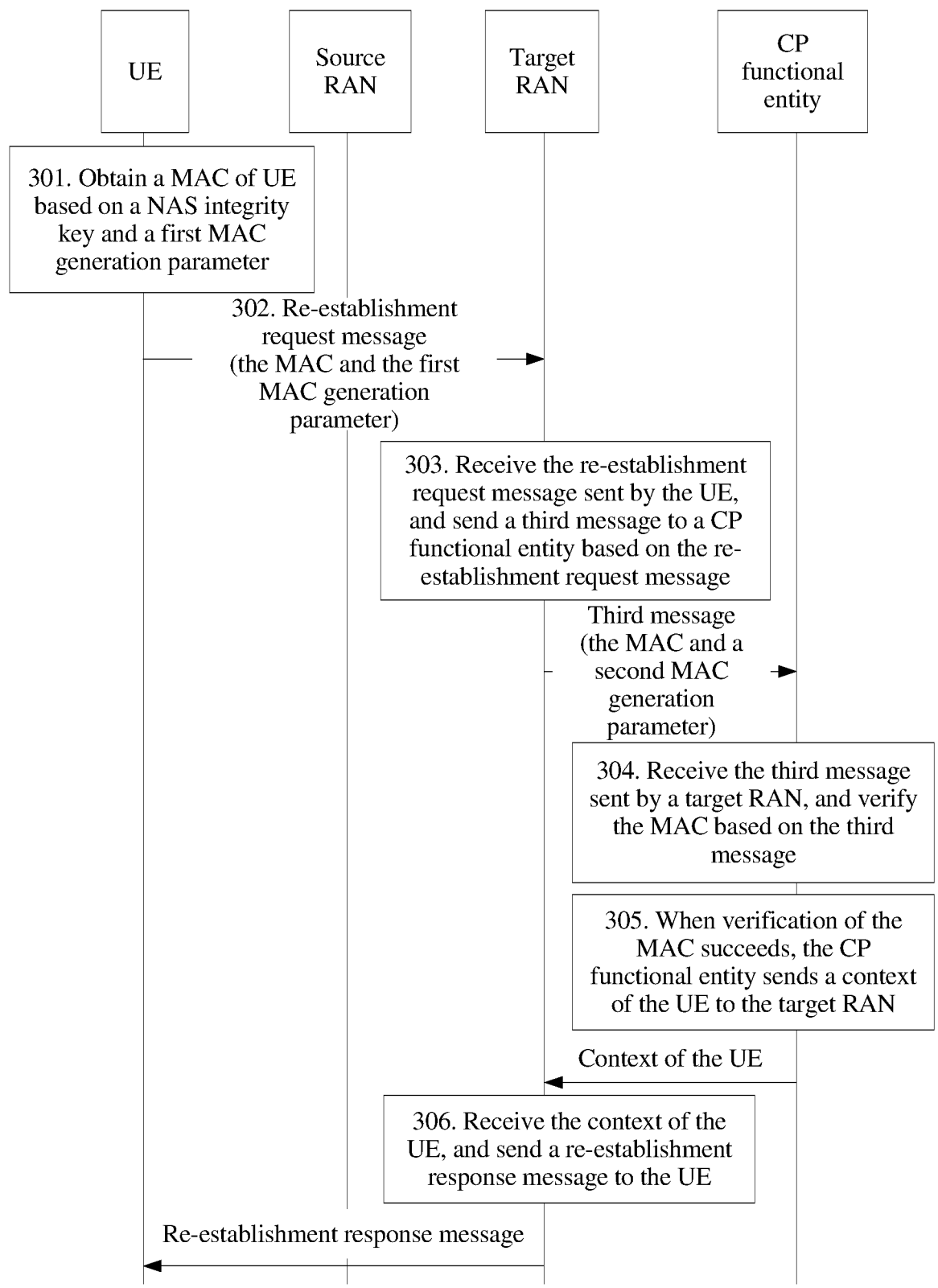
FIG. 3 is a schematic diagram of another link re-establishment method according to an embodiment of the present disclosure.

As shown in FIG. 3, another link re-establishment method provided in an embodiment of the present disclosure is specifically described as follows.

301. UE obtains a MAC of the UE based on a NAS integrity key and a first MAC generation parameter.

The first MAC generation parameter includes an identifier of the UE, and may further include a NAS parameter. Specifically, the NAS parameter may be a NAS count, and no limitation is imposed. The identifier of the UE may include at least one of an S-TMSI, a GUTI, a partial field of the S-TMSI, and a partial field of the GUTI.

Specifically, for obtaining of the MAC, refer to related descriptions in the embodiment shown in FIG. 2A and FIG. 2B, and details are not described again.

302. The UE sends a re-establishment request message to a target RAN, where the re-establishment request message includes the MAC and a second MAC generation parameter.

The second MAC generation parameter may be the same as the first MAC generation parameter, or may include the first MAC generation parameter and a target PCI of the UE. This is not limited.

To be specific, the second MAC generation parameter includes the identifier of the UE. In addition, the second MAC generation parameter may further include a NAS parameter, or the second MAC generation parameter may further include the NAS parameter and the target PCI of the UE.

303. The target RAN receives the re-establishment request message sent by the UE, and sends a third message to a CP functional entity based on the re-establishment request message.

The third message includes the second MAC generation parameter and the MAC.

Specifically, step 303 may include the following two steps.

3031. The target RAN obtains an identifier of the CP functional entity based on an identifier of the UE.

For example, if the identifier of the UE is a GUTI or an S-TMSI, the target RAN obtains a GUMMEI from the identifier of the UE.

3032. The target RAN sends the third message to the CP functional entity based on the identifier of the CP functional entity.

304. The CP functional entity receives the third message sent by the target RAN, and verifies the MAC based on the third message.

Specifically, step 304 may include:

3041. Obtain the NAS integrity key of the UE based on the identifier of the UE in the second MAC generation parameter.

3042. Verify the MAC based on the NAS integrity key of the UE and the second MAC generation parameter.

It should be noted that for details about step 3041, refer to step 2051, and for step 3042, refer to step 2052. Details are not described again.

305. When verification of the MAC succeeds, the CP functional entity sends a context of the UE to the target RAN.

306. The target RAN receives the context of the UE, and sends a re-establishment response message to the UE.

Specifically, when step 305 is performed, in step 306, the target RAN receives the context of the UE sent by the CP functional entity.

For the re-establishment response message, refer to related description in step 209, and details are not described again.

In the method provided in the foregoing embodiment, the target RAN sends the second MAC generation parameter and the MAC to the CP functional entity based on the first MAC generation parameter and the MAC that are sent by the UE, and the CP functional entity sends the context of the UE to the target RAN when verification performed by the CP functional entity on the MAC succeeds. This increases a speed of restoring the context of the UE by the target RAN, and improves efficiency.

Optionally, in another implementation scenario of the foregoing embodiment, after step 304 and before step 305, or after step 305, the foregoing method further includes steps 305a and 305b, which are specifically as follows.

305a. When verification of the MAC succeeds, the CP functional entity sends a fifth message to the source RAN.

The fifth message includes the identifier of the UE. Further, the fifth message may include a verification result of the MAC.

305b. The source RAN receives the fifth message sent by the CP functional entity, and deletes the context of the UE based on the identifier of the UE included in the fifth message.

Figure 4A:
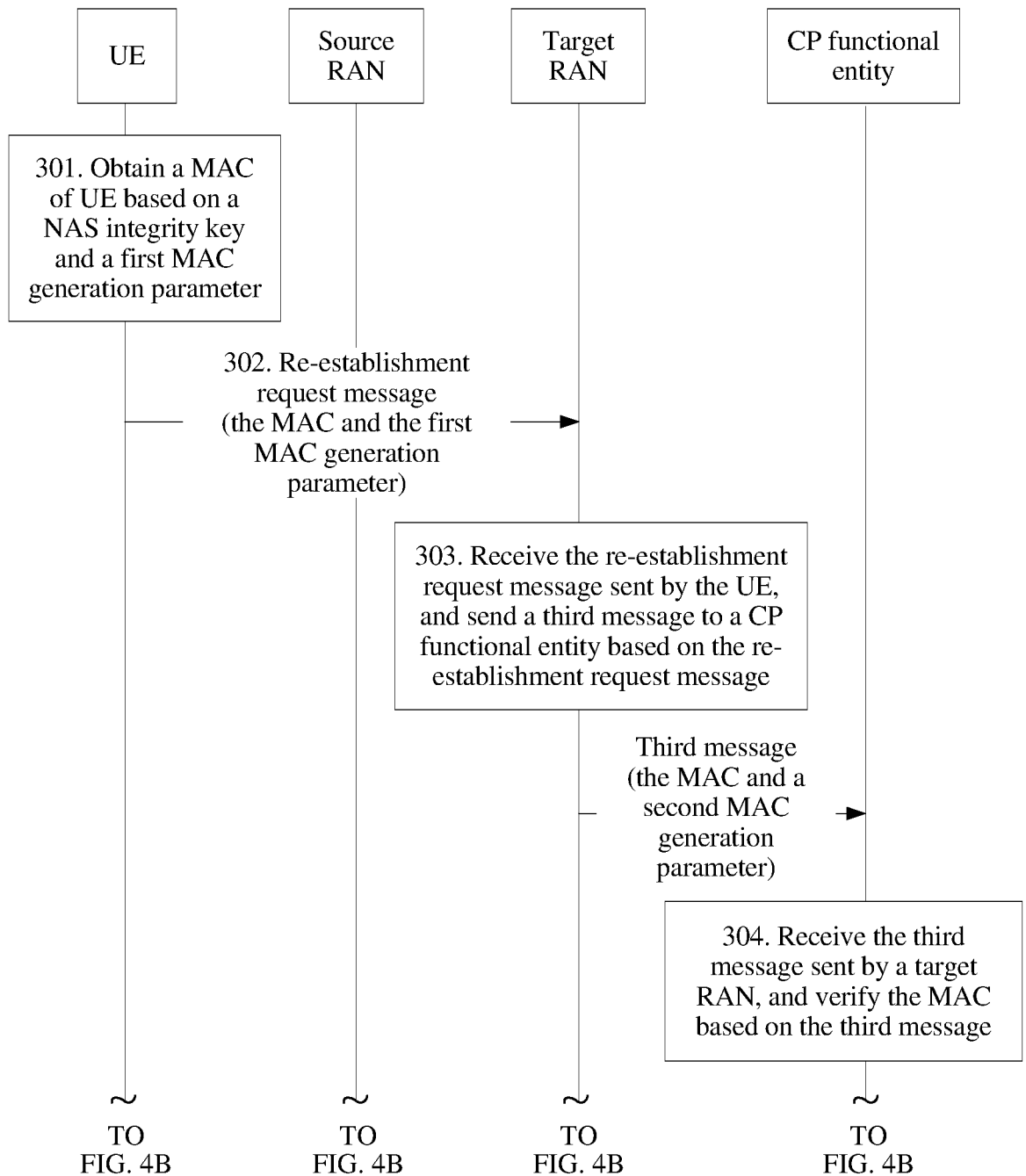
FIG. 4A and FIG. 4B are a schematic diagram of still another link re-establishment method according to an embodiment of the present disclosure.
Figure 4B:
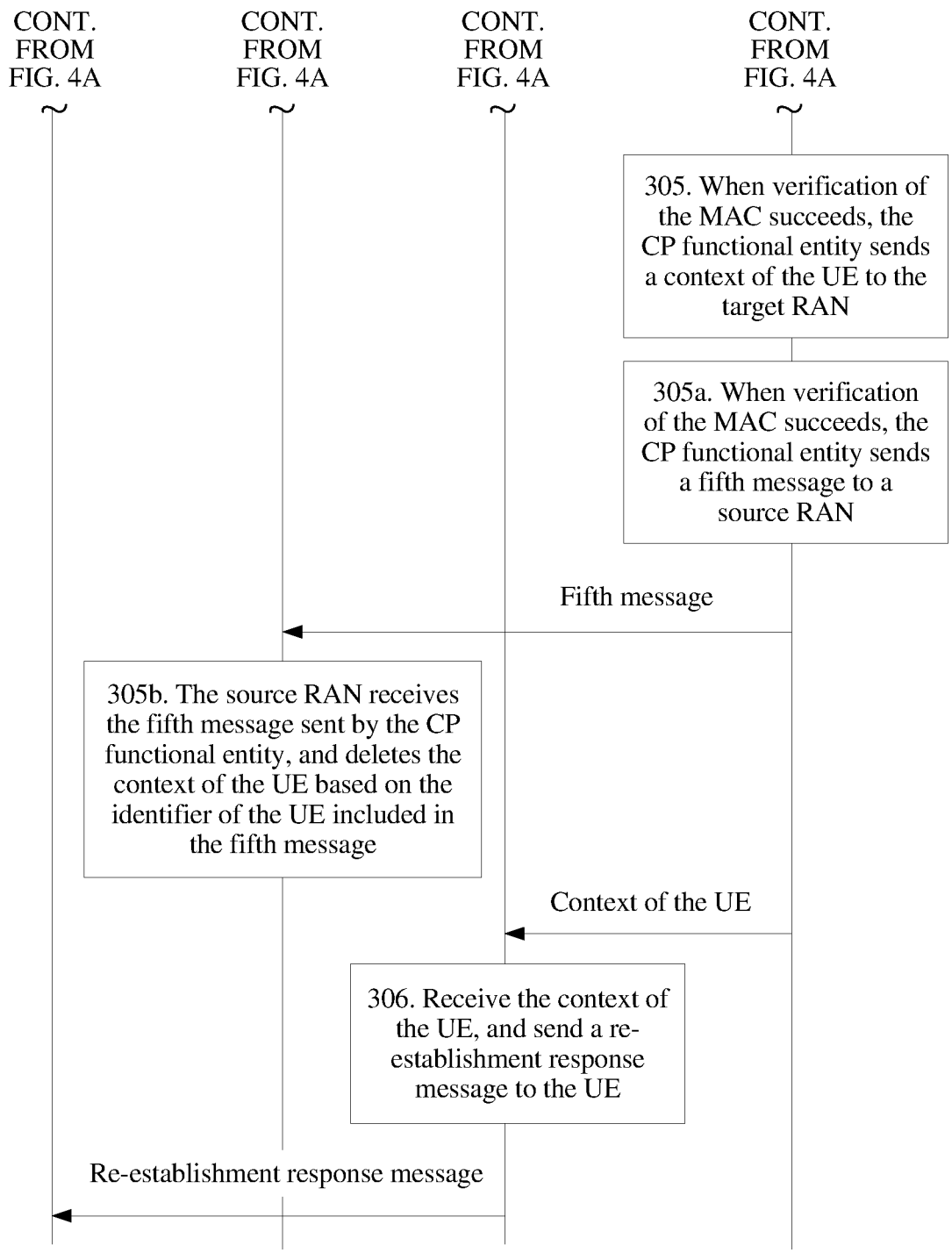

For example, FIG. 4A and FIG. 4B show steps 305a and 305b after step 305.

Further, the fifth message may be used to request the source RAN to send data of the UE to the control plane functional entity, and the foregoing method may further include steps 305c and 305d, which are specifically as follows.

305c. The source RAN sends data of the UE stored on the source RAN to the CP functional entity.

305d. The CP functional entity receives the data of the UE sent by the source RAN, and sends the received data of the UE to the UE by using the target RAN.

For example, the CP functional entity sends a downlink NAS PDU to the target RAN.

In the method provided in the foregoing embodiment scenario, the source RAN sends the received data of the UE to the target RAN by using the CP functional entity, and then the target RAN sends the received data of the UE to the UE. This avoids a loss of the data of the UE, improves data transmission efficiency, and enhances network transmission reliability.

Optionally, in still another implementation scenario of the foregoing embodiment, the foregoing method further includes: updating, by the CP functional entity, the identifier of the UE, and sending an updated identifier of the UE to the target RAN.

Alternatively, steps 305 and 306 in the foregoing embodiment may be replaced with the following step:

When verification of the MAC fails, the CP functional entity sends the verification result of the MAC to the target RAN, and the target RAN sends, to the UE, a message that is used to indicate a re-establishment failure.

The verification result of the MAC may be specifically transmitted in the explicit manner or the implicit manner described in the embodiment shown in FIG. 2A and FIG. 2B, and details are not described again.

Specifically, the message used to indicate a re-establishment failure may carry a failure cause value. The failure cause value may be at least one bit, and is used to indicate a cause of the link re-establishment failure, for example, a MAC verification failure, and is used to notify the UE of the cause of the link re-establishment failure, so that the UE can learn the failure cause and adjust an access policy in a timely manner.

Figure 5A:
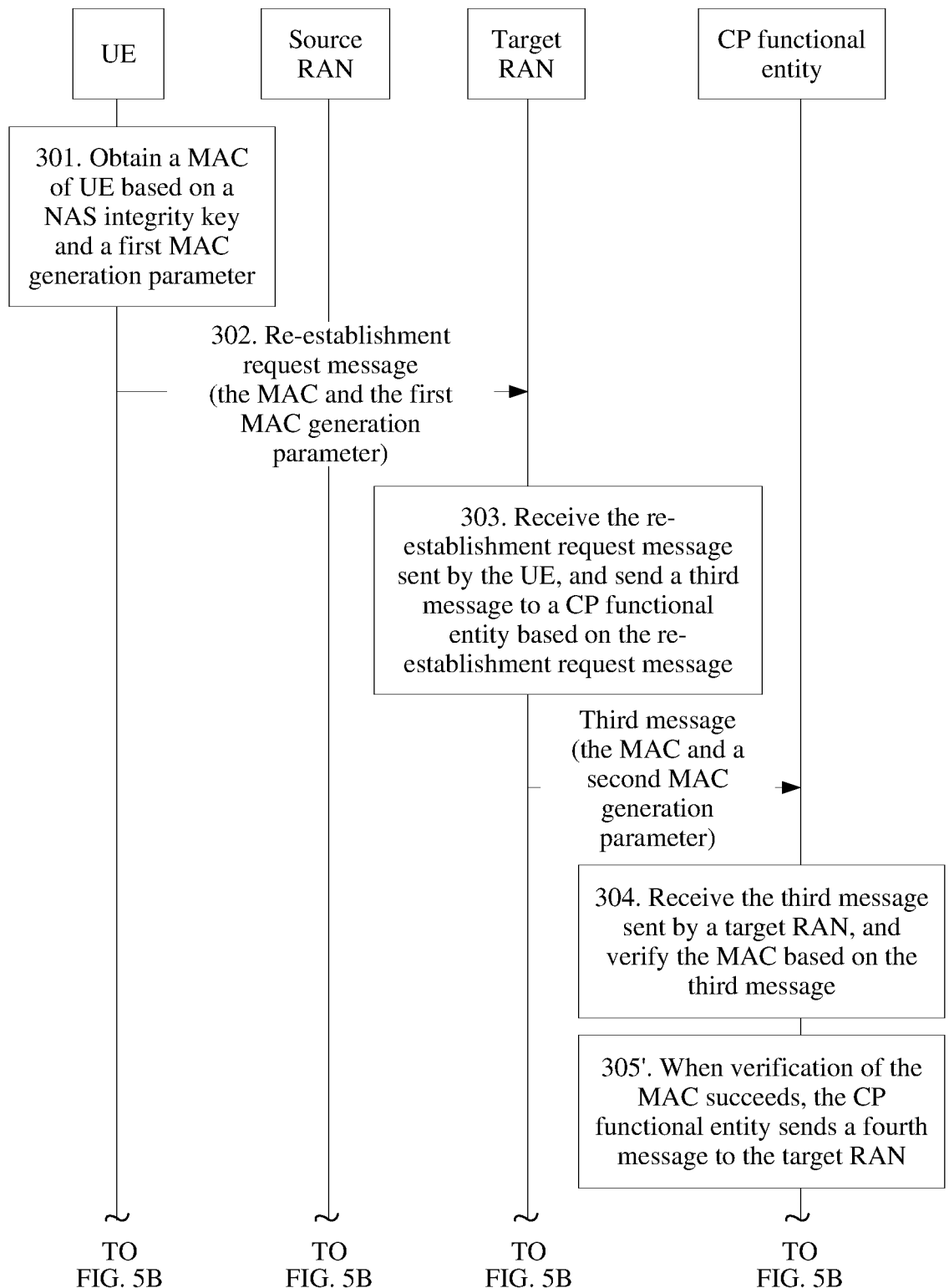
FIG. 5A and FIG. 5B are a schematic diagram of yet another link re-establishment method according to an embodiment of the present disclosure.
Figure 5B:
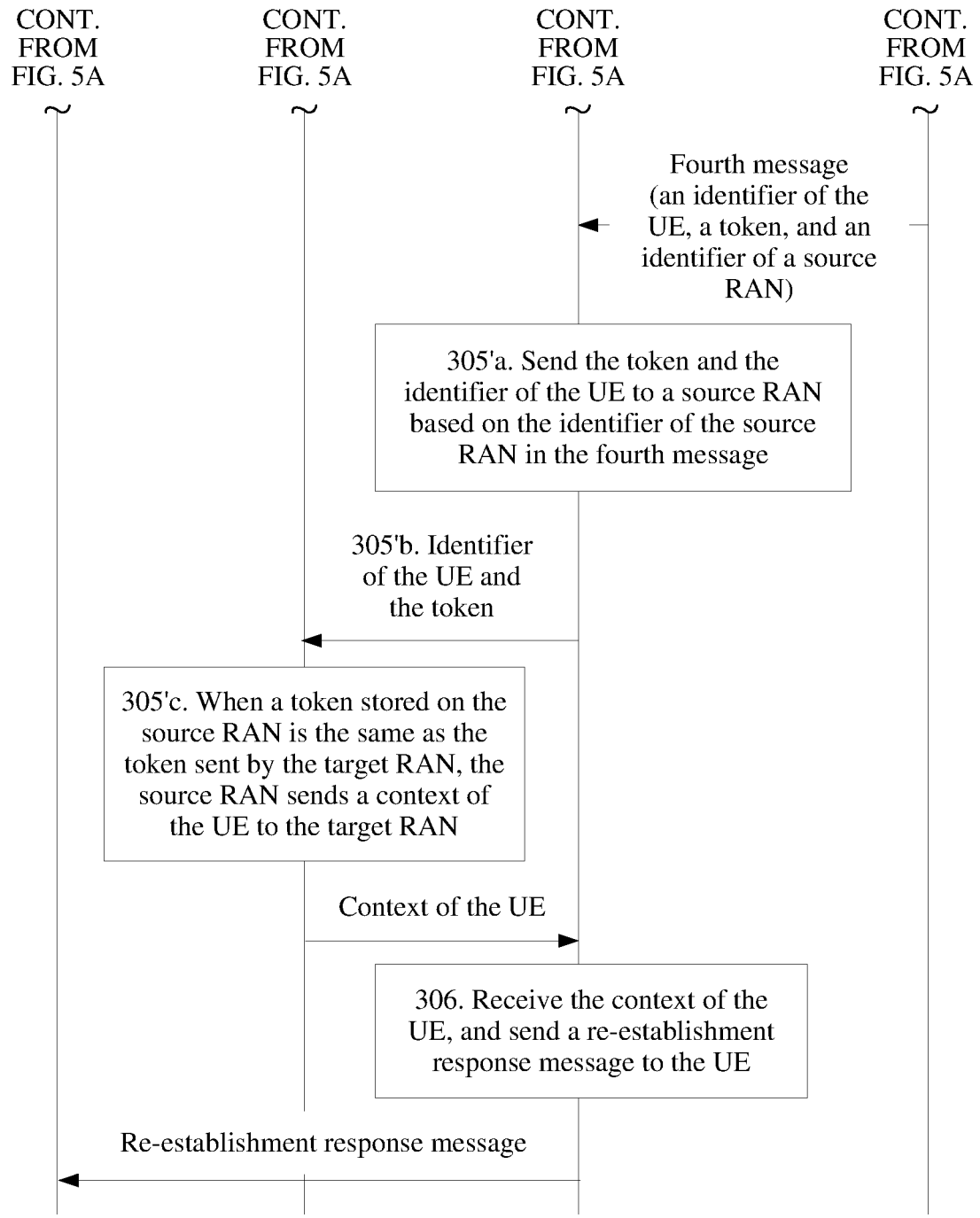

As shown in FIG. 5A and FIG. 5B, an embodiment of the present disclosure provides still another link re-establishment method. The method is implemented on the basis of the embodiment shown in FIG. 3. For example, the method inherits steps 301 to 304 and step 306 in the embodiment shown in FIG. 3. In this method, step 305 in the embodiment shown in FIG. 3 is replaced with step 305', and before step 306, the method further includes steps 305'a to 305'c, which are specifically as follows.

305'. When verification of the MAC succeeds, the CP functional entity sends a fourth message to the target RAN, where the fourth message includes the identifier of the UE, a token of the source RAN, and an identifier of the source RAN.

The token is allocated by the CP functional entity to the source RAN, and the token may be generated in a random manner, or may be generated based on a preset parameter.

Specifically, both the token of the source RAN and the identifier of the source RAN may be pre-stored on the CP functional entity, and have an association relationship with the identifier of the UE. When verification of the MAC succeeds, the CP functional entity finds the token and the identifier that are of the source RAN based on the identifier of the UE. Apparently, when the token of the source RAN is generated based on the preset parameter, the token of the source RAN may not be pre-stored on the CP functional entity, but generated by the CP functional entity based on the preset parameter when verification of the MAC succeeds. This is not limited.

305'a. The target RAN receives the fourth message sent by the CP functional entity, and sends the token and the identifier of the UE to the source RAN based on the identifier of the source RAN in the fourth message.

305'b. The source RAN receives the token and the identifier of the UE, where the token and the identifier are sent by the target RAN.

305'c. When a token stored on the source RAN is the same as the token sent by the target RAN, the source RAN sends the context of the UE to the target RAN.

The token stored on the source RAN may be sent by the CP functional entity to the source RAN when the source RAN establishes a first link with the CP functional entity. For example, when the source RAN establishes an S1 connection to the CP functional entity, the CP functional entity sends the token and the identifier of the UE to the source RAN.

Correspondingly, when step 305' is performed, that the target RAN receives the context of the UE in step 306 specifically includes: receiving, by the target RAN, the context of the UE sent by the source RAN.

In the method provided in the foregoing embodiment, the target RAN sends the second MAC generation parameter and the MAC to the CP functional entity based on the first MAC generation parameter and the MAC that are sent by the UE, and the target RAN sends information such as the token to the source RAN when verification performed by the CP functional entity on the MAC succeeds. The source RAN verifies the token, and sends the context of the UE to the target RAN when verification of the token succeeds. This not only increases a speed of restoring the context of the UE by the target RAN, but also improves network security through double verification.

Optionally, in an implementation scenario of the foregoing embodiment shown in FIG. 5A and FIG. 5B, after step 306, the foregoing method further includes: allocating, by the CP functional entity, a token to the target RAN, and sending the allocated token to the target RAN.

Specifically, the target RAN may send an S1 path switch request to the CP functional entity, and the CP functional entity allocates the token to the target RAN, and sends the allocated token to the target RAN by using an S1 path switch request acknowledgment (S1 path switch request ack).

Further, the foregoing method further includes: updating, by the CP functional entity, the identifier of the UE, and sending an updated identifier of the UE to the target RAN.

Specifically, the CP functional entity may send the S1 path switch request ack to the target RAN.

Optionally, in a second implementation scenario of the embodiment shown in FIG. 5A and FIG. 5B, step 305'c may further include: sending, by the source RAN, the data of UE stored on the source RAN to the CP functional entity.

Correspondingly, the foregoing method further includes: receiving, by the CP functional entity, the data of the UE sent by the source RAN, and sending the received data of the UE to the UE by using the target RAN.

For example, the CP functional entity sends a downlink NAS PDU to the target RAN.

In the method provided in the foregoing embodiment scenario, the source RAN sends the received data of the UE to the target RAN by using the CP functional entity, and then the target RAN sends the received data of the UE to the UE. This avoids a loss of the data of the UE, improves data transmission efficiency, and enhances network transmission reliability.

Alternatively, steps 305'c and 306 in the embodiment shown in FIG. 5A and FIG. 5B may be replaced with the following steps:

When the token stored on the source RAN is different from the token sent by the target RAN, the source RAN sends an indication message to the target RAN, where the indication message is used to indicate that verification of the token fails or the source RAN refuses to restore the context of the UE; and the target RAN sends, to the UE, a message that is used to indicate a re-establishment failure.

For example, the target RAN may add the cause of the link re-establishment failure to the message, to send the cause to the UE, so that the UE can learn the failure cause and adjust an access policy in a timely manner.

Optionally, in still another implementation scenario of the embodiment shown in FIG. 5A and FIG. 5B, step 305'c may further include: sending, by the source RAN, the data of the UE stored on the source RAN to the target RAN.

Correspondingly, the foregoing method further includes: receiving, by the target RAN, the data of the UE sent by the source RAN.

Specifically, the data of the UE may be sent by using the NAS PDU, and details are not described again.

In the foregoing implementation scenario, the source RAN directly sends the data of the UE to the target RAN. This shortens a transmission path of the data of the UE, avoids a waste of transmission resources in a core network, and improves performance.

Figure 6:
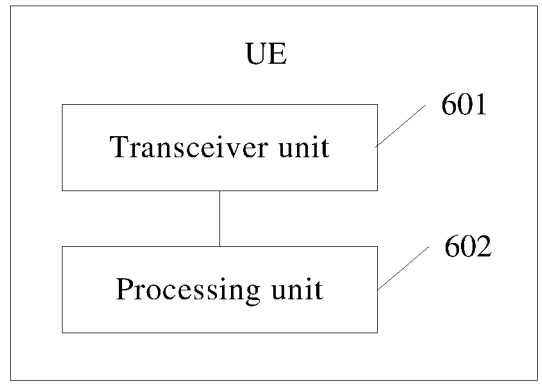
FIG. 6 is a structural diagram of UE according to an embodiment of the present disclosure.

As shown in FIG. 6, an embodiment provides UE. The UE may be configured to perform actions of UE in any one of the embodiments shown in FIG. 2A and FIG. 2B to FIG. 5A and FIG. 5B or the embodiment shown in FIG. 17A and FIG. 17B, and the UE specifically includes a processing unit 601 and a transceiver unit 602.

The processing unit 601 is configured to obtain a MAC of the UE based on a NAS integrity key and a first MAC generation parameter, where the first MAC generation parameter includes an identifier of the UE.

The transceiver unit 602 is configured to send a re-establishment request message to a target RAN, where the re-establishment request message includes the MAC and the first MAC generation parameter.

The transceiver unit 602 is further configured to receive a re-establishment response message of the target RAN.

The re-establishment request message may be an RRC connection re-establishment request message.

For the first MAC generation parameter, the identifier of the UE, the re-establishment request message, the re-establishment response message, and the like, refer to related descriptions in the embodiment shown in FIG. 2A and FIG. 2B, and details are not described again.

Specifically, the processing unit 601 may be configured to perform steps 2011 and 2012 in the embodiment shown in FIG. 2A and FIG. 2B, and details are not described again.

The UE provided in the foregoing embodiment sends the re-establishment request message to the target RAN, and the re-establishment request message carries the first MAC generation parameter and the MAC, so that the target RAN sends a second MAC generation parameter and the MAC to a CP functional entity, and then the CP functional entity verifies the MAC based on the received information, thereby implementing authentication on the UE, and ensuring network security. In addition, the UE indirectly triggers, by sending the re-establishment request message, the CP functional entity to perform authentication on the UE. This resolves a prior-art problem that an excessively long time is consumed to re-establish a connection to a target RAN by using an RAU procedure, increases a speed of re-establishing a connection between UE and a network, and improving user experience.

Figure 7:
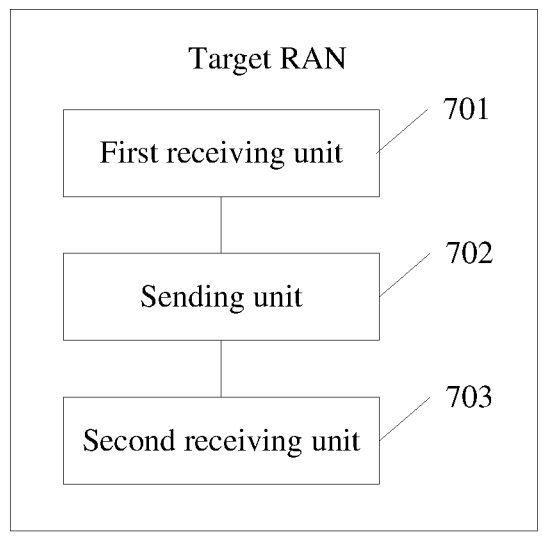
FIG. 7 is a schematic structural diagram of a target RAN according to an embodiment of the present disclosure.

As shown in FIG. 7, an embodiment provides a target RAN. The target RAN may be configured to perform actions of a target RAN in the embodiment shown in FIG. 2A and FIG. 2B or FIG. 17A and FIG. 17B, and the target RAN specifically includes a first receiving unit 701, a sending unit 702, and a second receiving unit 703.

The first receiving unit 701 is configured to receive a re-establishment request message sent by UE, where the re-establishment request message includes a MAC of the UE and a first MAC generation parameter, and the first MAC generation parameter includes an identifier of the UE.

The sending unit 702 is configured to send a first message to a source RAN based on the re-establishment request message received by the first receiving unit 701, where the first message includes a second MAC generation parameter and the MAC.

The second receiving unit 703 is configured to: receive a context of the UE sent by the source RAN, and send a re-establishment response message to the UE by using the sending unit 702.

The second MAC generation parameter may be the same as the first MAC generation parameter, or may be different from the first MAC generation parameter. For example, the second MAC generation parameter may include the first MAC generation parameter and a target PCI of the UE. Alternatively, the second MAC generation parameter includes all parameters in the first MAC generation parameter except a source PCI of the UE.

Optionally, the re-establishment request message further includes the source PCI of the UE, or the first MAC generation parameter includes the source PCI of the UE.

Optionally, the sending unit 702 is specifically configured to send the first message to the source RAN based on the source PCI.

For the first MAC generation parameter, the context of the UE, the identifier of the UE, the re-establishment response message, and the like, refer to related descriptions in the embodiment shown in FIG. 2A and FIG. 2B.

The target RAN provided in the foregoing embodiment receives the re-establishment request message sent by the UE, where the re-establishment request message carries the first MAC generation parameter and the MAC, and sends the second MAC generation parameter and the MAC to a CP functional entity, so that the CP functional entity verifies integrity of the MAC based on the received information, to implement validity verification of the re-establishment request message. This prevents the re-establishment request message from being forged, tampered, or replayed, and ensures network security. In addition, when verification of the MAC succeeds, the target RAN receives the context of the UE sent by the source RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

Figure 8:
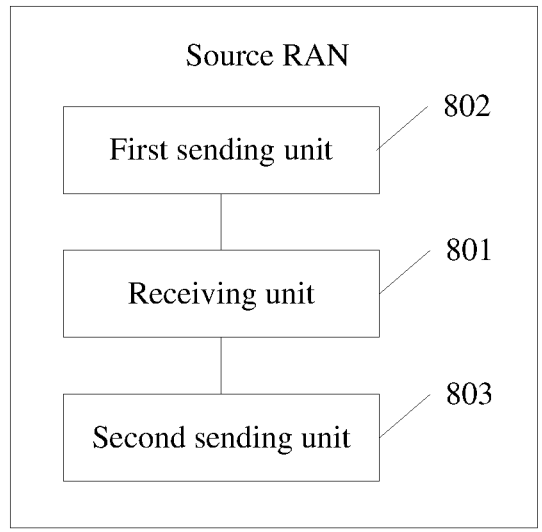
FIG. 8 is a schematic structural diagram of a source RAN according to an embodiment of the present disclosure.

As shown in FIG. 8, an embodiment provides a source RAN. The source RAN may be configured to perform actions of a source RAN in the embodiment shown in FIG. 2A and FIG. 2B or FIG. 17A and FIG. 17B, and the source RAN specifically includes a receiving unit 801, a first sending unit 802, and a second sending unit 803.

The receiving unit 801 is configured to receive a first message sent by a target RAN, where the first message includes a MAC of UE and a second MAC generation parameter, and the second MAC generation parameter includes an identifier of the UE.

The first sending unit 802 is configured to send a second message to a CP functional entity based on the first message received by the receiving unit 801, where the second message includes a third MAC generation parameter and the MAC.

The receiving unit 801 is further configured to receive a verification result, sent by the CP functional entity, of the MAC.

The second sending unit 803 is configured to: when the verification result indicates that verification of the MAC succeeds, send a context of the UE to the target RAN.

The second MAC generation parameter may further include at least one of a NAS parameter and an RRC parameter. The RRC parameter may include a source PCI of the UE.

The third MAC generation parameter may be the same as the second MAC generation parameter, or may be different from the second MAC generation parameter. Specifically, the third MAC generation parameter may include all parameters in the second MAC generation parameter except the identifier of the UE. In addition, in a scenario in which the source PCI of the UE is used to generate the MAC, when the second MAC generation parameter does not include the source PCI of the UE, the third MAC generation parameter further includes the source PCI of the UE.

Optionally, the first sending unit 802 is specifically configured to: obtain an identifier of a first link of the UE based on the identifier of the UE, where the first link is used to transmit data of the UE between the source RAN and the CP functional entity; and send the second message to the CP functional entity through the first link.

Optionally, the first sending unit 802 is further configured to send the data of the UE stored on the source RAN to the CP functional entity.

It should be noted that, for the first link, the identifier of the first link, the identifier of the UE, the second MAC generation parameter, and the like, refer to related descriptions in the embodiment shown in FIG. 2A and FIG. 2B, and details are not described herein again.

The source RAN provided in the foregoing embodiment receives the verification result, sent by the CP functional entity, of the MAC, and when verification of the MAC succeeds, the source RAN sends the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

Figure 9:
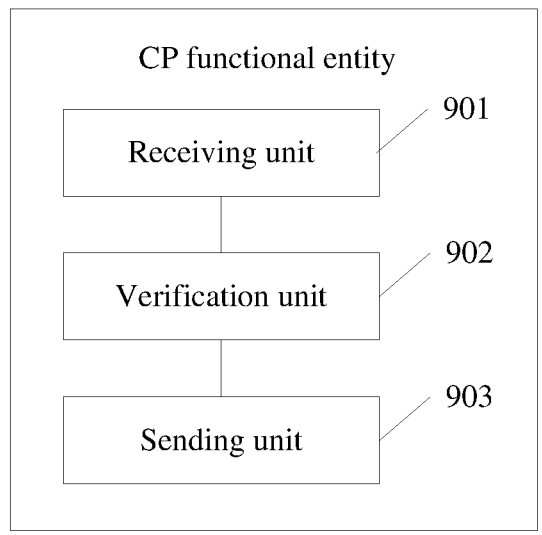
FIG. 9 is a schematic structural diagram of a CP functional entity according to an embodiment of the present disclosure.

As shown in FIG. 9, an embodiment provides a CP functional entity. The CP functional entity may be configured to perform actions of a CP functional entity in the embodiment shown in FIG. 2A and FIG. 2B, and specifically includes a receiving unit 901, a verification unit 902, and a sending unit 903.

The receiving unit 901 is configured to receive a second message sent by a source RAN, where the second message includes a MAC of UE and a second MAC generation parameter, where the second MAC generation parameter includes an identifier of the UE.

The verification unit 902 is configured to verify the MAC based on the second message received by the receiving unit 901.

The sending unit 903 is configured to send a verification result of the MAC to the source RAN.

Optionally, the verification unit 902 may be configured to perform steps 2051 and 2052, and is specifically configured to: obtain a NAS integrity key of the UE based on the second message; and verify the MAC based on the NAS integrity key and the second MAC generation parameter.

Optionally, the second MAC generation parameter further includes at least one of a NAS parameter and an RRC parameter.

Alternatively, the second MAC generation parameter further includes at least one of the NAS parameter and the RRC parameter, and a target physical cell identifier PCI of the UE.

For manners of sending the NAS parameter, the RRC parameter, the second MAC generation parameter, the identifier of the UE, the second message, and the verification result of the MAC, refer to related descriptions in the embodiment shown in FIG. 2A and FIG. 2B, and details are not described herein again.

Optionally, in an implementation scenario of the foregoing embodiment, the receiving unit 901 is further configured to receive data of the UE sent by the source RAN; and the sending unit 903 is further configured to send the data of the UE to the target RAN.

The CP functional entity provided in the foregoing embodiment verifies the MAC based on the second MAC generation parameter, sends the verification result to the source RAN, and triggers the source RAN to send the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience. In addition, the CP functional entity verifies integrity of the MAC, to implement validity verification on the re-establishment request message. This prevents the re-establishment request message from being forged, tampered, or replayed, and ensures network security.

Figure 10:
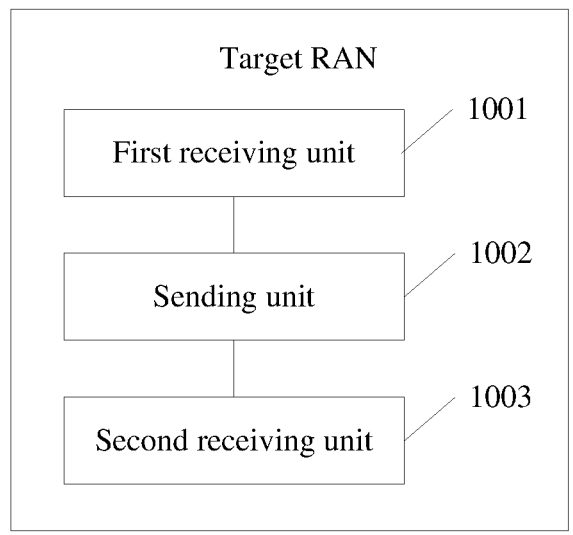
FIG. 10 is a schematic structural diagram of another target RAN according to an embodiment of the present disclosure.

As shown in FIG. 10, an embodiment provides another target RAN. The target RAN may be configured to perform actions of a target RAN in any one of the embodiments shown in FIG. 3 to FIG. 5A and FIG. 5B, and specifically includes a first receiving unit 1001, a sending unit 1002, and a second receiving unit 1003.

The first receiving unit 1001 is configured to receive a re-establishment request message sent by UE, where the re-establishment request message includes a MAC of the UE and a first MAC generation parameter, and the first MAC generation parameter includes an identifier of the UE.

The sending unit 1002 is configured to send a third message to a CP functional entity based on the re-establishment request message received by the first receiving unit 1001, where the third message includes a second MAC generation parameter and the MAC.

The second receiving unit 1003 is configured to: receive a context of the UE, and send a re-establishment response message to the UE by using the sending unit 1002.

The second MAC generation parameter is the same as the first MAC generation parameter, or the second MAC generation parameter includes the first MAC generation parameter and a target PCI of the UE.

The first MAC generation parameter may further include a NAS parameter.

For the first MAC generation parameter, the second MAC generation parameter, the context of the UE, the identifier of the UE, the re-establishment response message, and the like, refer to related descriptions in the embodiment shown in FIG. 3, and details are not described again.

The target RAN provided in the foregoing embodiment receives the first MAC generation parameter and the MAC that are sent by the UE, and sends the second MAC generation parameter and the MAC to the CP functional entity, so that the CP functional entity verifies the MAC, thereby ensuring network security. In addition, after verification of the MAC succeeds, the target RAN receives the context of the UE sent by the source RAN or the CP functional entity. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience.

Optionally, the sending unit 1002 is specifically configured to: obtain an identifier of the CP functional entity based on the identifier of the UE; and send the third message to the CP functional entity based on the identifier of the CP functional entity.

The identifier of the CP functional entity may be a GUMMEI.

Optionally, in an implementation scenario of the foregoing embodiment, the second receiving unit 1003 is specifically configured to: receive the context of the UE sent by the CP functional entity.

When verification performed by the CP functional entity on the MAC succeeds, the CP functional entity sends the context of the UE to the target RAN, increasing a speed of restoring the context of the UE by the target RAN, and improving efficiency.

Optionally, in an implementation scenario of the foregoing embodiment, the second receiving unit 1003 is specifically configured to: receive the context of the UE sent by the source RAN.

Further, the second receiving unit 1003 may be further configured to receive a fourth message sent by the CP functional entity, where the fourth message includes the identifier of the UE, a token of the source RAN, and an identifier of the source RAN.

The sending unit 1002 may be further configured to send the token and the identifier of the UE to the source RAN based on the identifier of the source RAN received by the second receiving unit 1003.

Network security is further improved through double verification of the MAC and the token.

Figure 11:
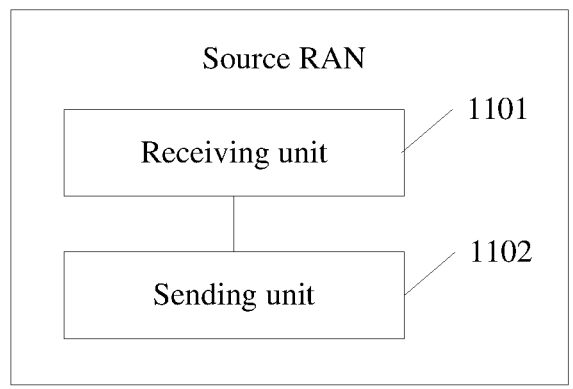
FIG. 11 is a schematic structural diagram of another source RAN according to an embodiment of the present disclosure.

As shown in FIG. 11, an embodiment provides another source RAN. The source RAN may be configured to perform actions of a source RAN in the embodiment shown in FIG. 5A and FIG. 5B, and the source RAN specifically includes a receiving unit 1101 and a sending unit 1102.

The receiving unit 1101 is configured to receive an identifier of UE and a token of the source RAN that are sent by a target RAN.

The sending unit 1102 is configured to: when a token stored on the source RAN is the same as the token sent by the target RAN, send a context of the UE to the target RAN.

Optionally, the sending unit 1102 is further configured to: when the token stored on the source RAN is the same as the token sent by the target RAN, send data of the UE stored on the source RAN to a CP functional entity.

For the token, the identifier of the UE, and the like, refer to related descriptions in the embodiment shown in FIG. 5A and FIG. 5B, and details are not described again.

The source RAN provided in the foregoing embodiment directly sends the context of the UE to the target RAN when verification of the token succeeds. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience. In addition, verification of the token ensures network security.

Figure 12:
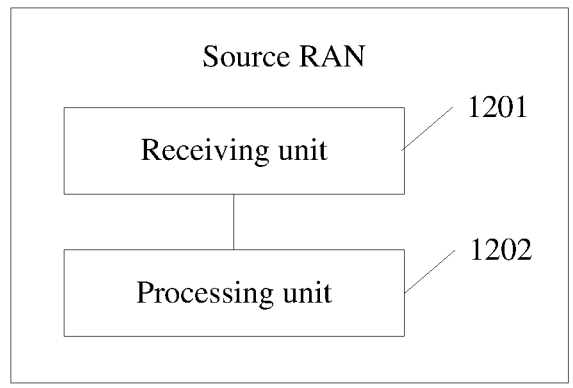
FIG. 12 is a schematic structural diagram of still another source RAN according to an embodiment of the present disclosure.

As shown in FIG. 12, an embodiment provides still another source RAN. The source RAN may be configured to perform actions of a source RAN in the embodiment shown in FIG. 3 or FIG. 4A and FIG. 4B, and specifically includes a receiving unit 1201 and a processing unit 1202.

The receiving unit 1201 is configured to receive a fifth message sent by a CP functional entity, where the fifth message includes an identifier of UE.

The processing unit 1202 is configured to delete a context of the UE based on the identifier of the UE.

The fifth message may be used to request the source RAN to send data of the UE to the CP functional entity.

Further, the source RAN may further include a sending unit 1203.

The sending unit 1203 is configured to send the data of the UE stored on the source RAN to the CP functional entity.

For the identifier of the UE and the context of the UE, refer to related descriptions in the embodiment shown in FIG. 3 or FIG. 4A and FIG. 4B, and details are not described again.

Figure 13:
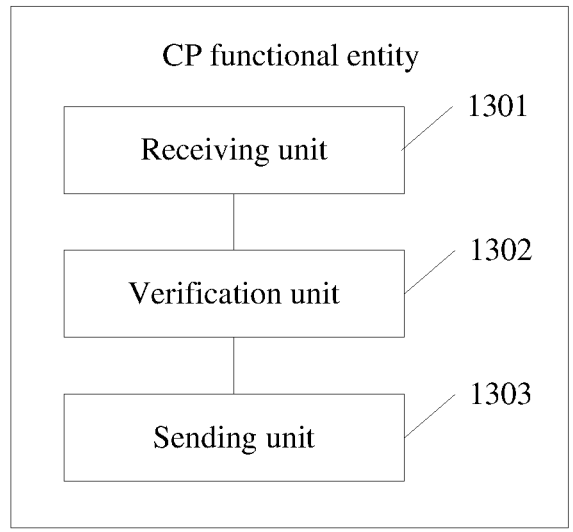
FIG. 13 is a schematic structural diagram of another CP functional entity according to an embodiment of the present disclosure.

As shown in FIG. 13, an embodiment provides another CP functional entity. The CP functional entity may be configured to perform actions of a CP functional entity in any one of the embodiments shown in FIG. 3 to FIG. 5A and FIG. 5B, and specifically includes a receiving unit 1301, a verification unit 1302, and a sending unit 1303.

The receiving unit 1301 is configured to receive a third message sent by a target RAN, where the third message includes a MAC of UE and a second MAC generation parameter, and the second MAC generation parameter includes an identifier of the UE.

The verification unit 1302 is configured to verify the MAC based on the third message received by the receiving unit 1301.

The sending unit 1303 is configured to: when verification of the MAC succeeds, send a context of the UE or a fourth message to the target RAN, where the fourth message includes the identifier of the UE, a token of a source RAN, and an identifier of the source RAN.

Optionally, the sending unit 1303 is further configured to: when verification of the MAC succeeds, send a fifth message to the source RAN, where the fifth message includes the identifier of the UE.

The fifth message may be used to request the source RAN to send data of the UE to the CP functional entity.

Optionally, the receiving unit 1301 is further configured to: receive the data of the UE sent by the source RAN.

The second MAC generation parameter further includes a NAS parameter.

Alternatively, the second MAC generation parameter further includes the NAS parameter and a target PCI of the UE.

It should be noted that, for the NAS parameter, the second MAC generation parameter, the identifier of the UE, the token, the context of the UE, and the like, respectively refer to related descriptions in the embodiments shown in FIG. 3 to FIG. 5A and FIG. 5B, and details are not described again.

The CP functional entity provided in the foregoing embodiment verifies the MAC based on the second MAC generation parameter, and sends the context of the UE to the target RAN after verification of the MAC succeeds, or sends the fourth message to the target RAN after verification of the MAC succeeds, so that the target RAN sends the token to the source RAN, and then the source RAN sends the context of the UE to the target RAN after verification of the token succeeds. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience. In addition, the CP functional entity verifies integrity of the MAC, to implement validity verification on the re-establishment request message. This prevents the re-establishment request message from being forged, tampered, or replayed, and ensures network security.

Figure 14:
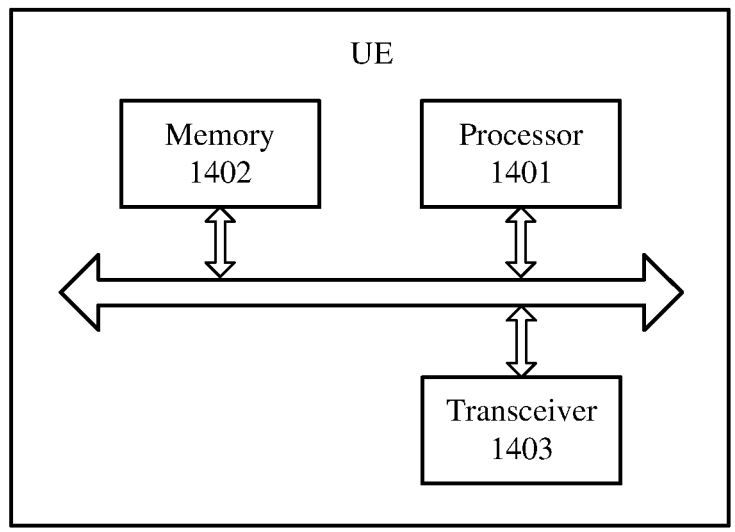
FIG. 14 is a structural diagram of hardware of UE according to an embodiment of the present disclosure.

As shown in FIG. 14, an embodiment provides UE. The UE may be configured to perform actions of UE in any one of the embodiments shown in FIG. 2A and FIG. 2B to FIG. 5A and FIG. 5B or the embodiment shown in FIG. 17A and FIG. 17B, and the UE specifically includes a processor 1401, a memory 1402, and a transceiver 1403.

The memory 1402 is configured to store a program.

The processor 1401 is configured to execute the program stored in the memory 1402, to implement actions of UE in the embodiments shown in FIG. 2A and FIG. 2B to FIG. 5A and FIG. 5B, and details are not described again.

It should be noted that the UE may send a re-establishment request message to a target RAN by using the transceiver 1403, and may receive a re-establishment response message by using the transceiver 1403.

Figure 15:
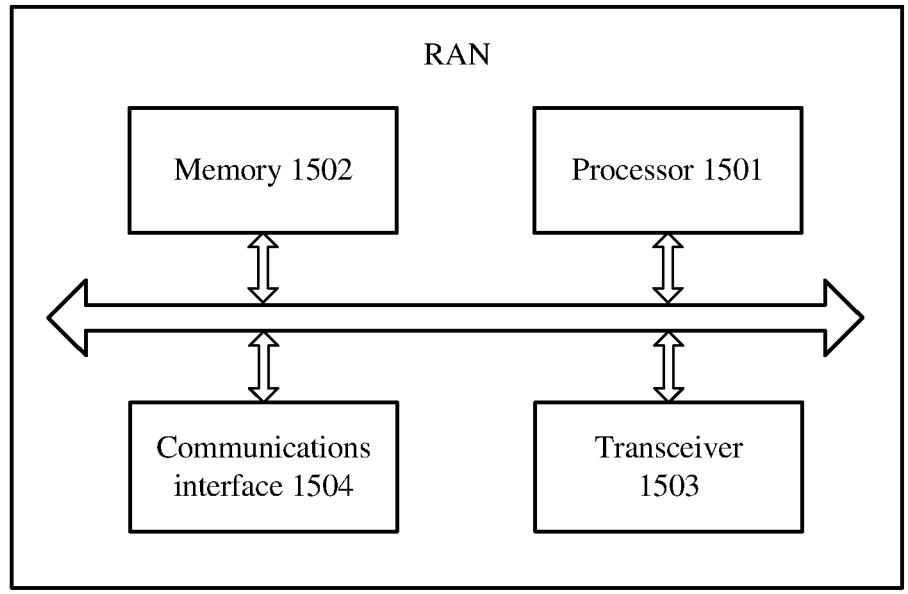
FIG. 15 is a structural diagram of hardware of an RAN according to an embodiment of the present disclosure.

As shown in FIG. 15, an embodiment provides an RAN. The RAN may be a source RAN, or may be a target RAN, and specifically includes a processor 1501, a memory 1502, a transceiver 1503, and a communications interface 1504.

The memory 1502 is configured to store a program.

Figure 17A:
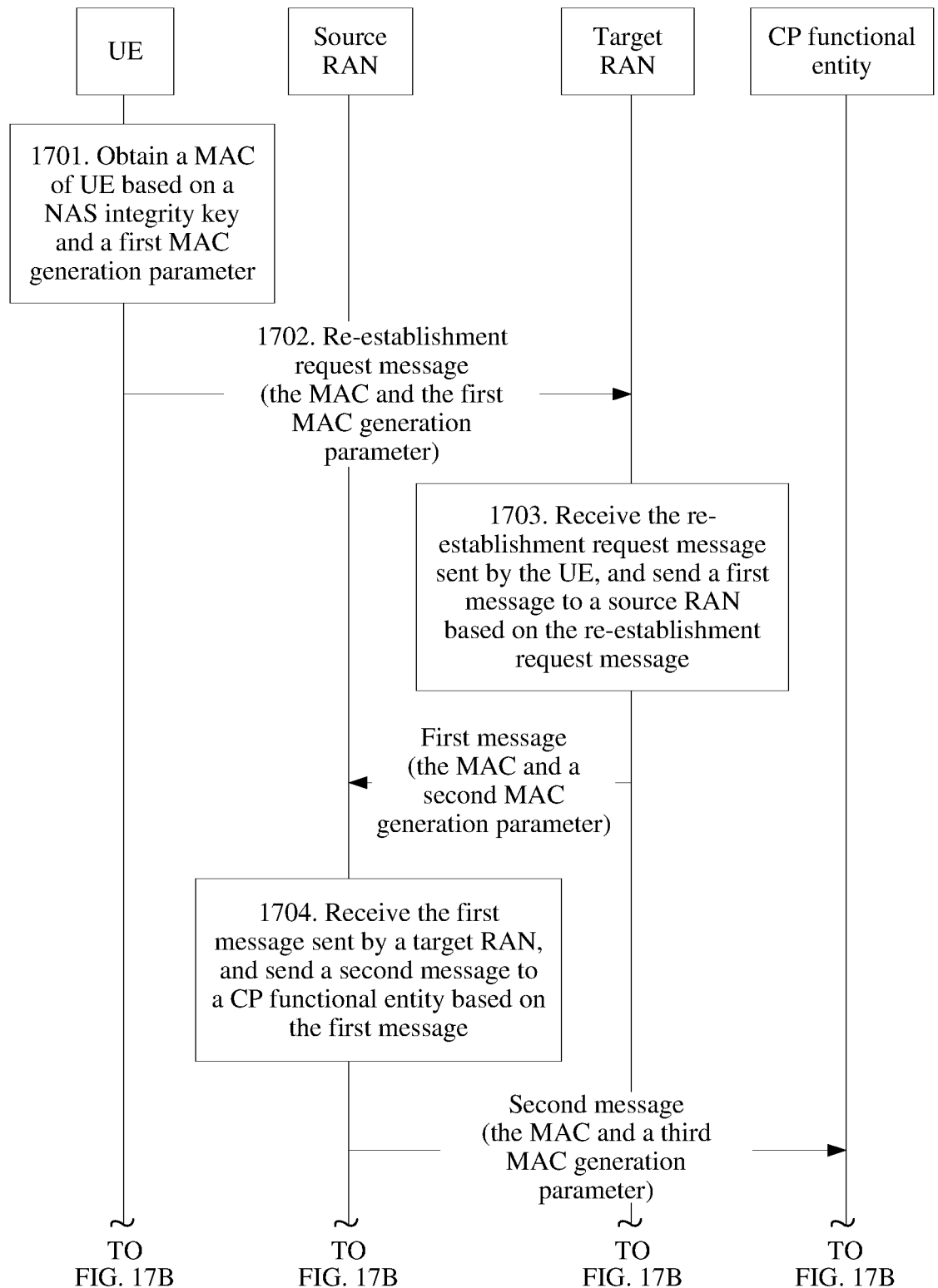
FIG. 17A and FIG. 17B are a flowchart of still yet another link re-establishment method according to an embodiment of the present disclosure.
Figure 17B:
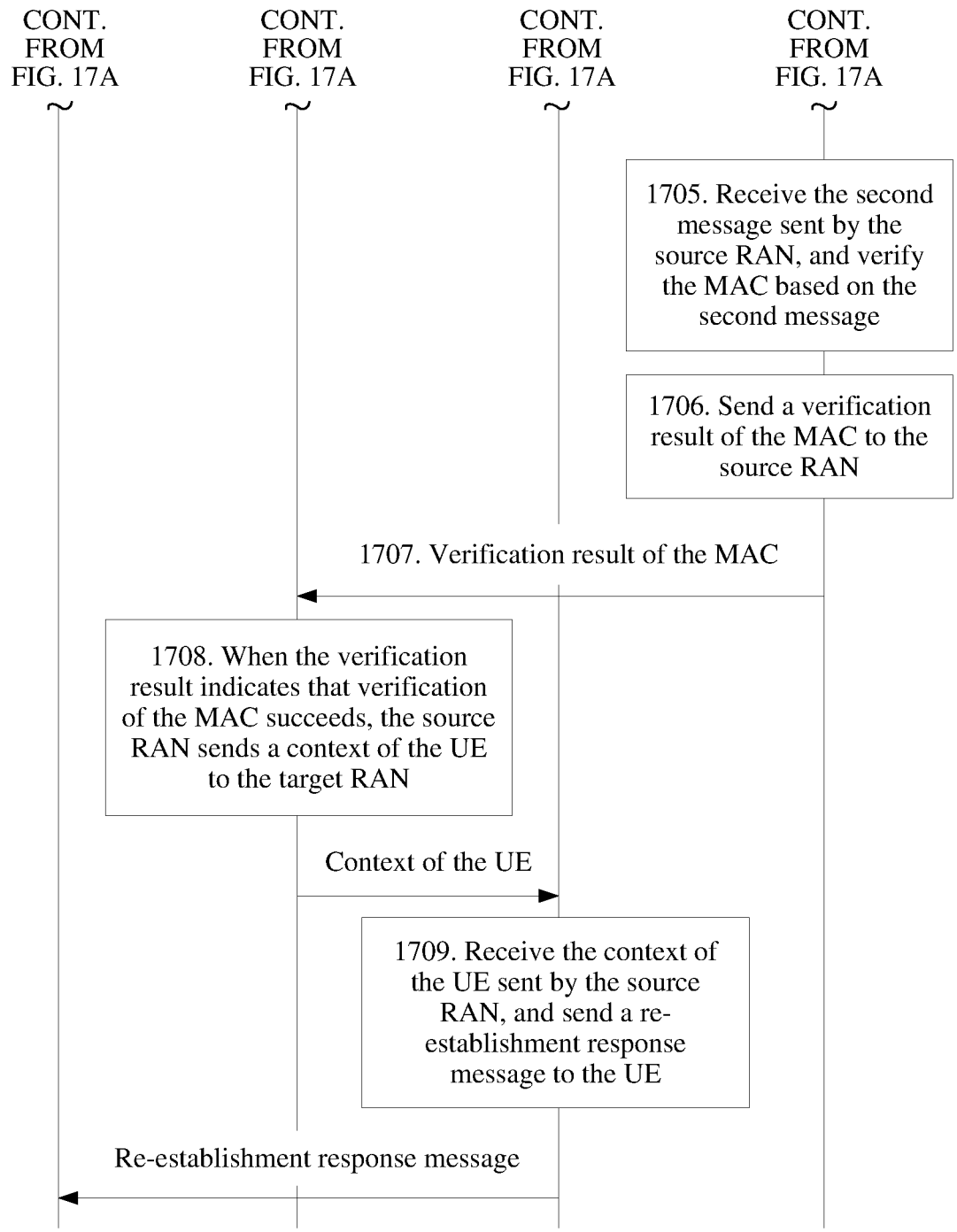

When the RAN is a source RAN, the processor 1501 is configured to execute the program stored in the memory 1502, to implement actions of a source RAN in the embodiments shown in FIG. 2A and FIG. 2B to FIG. 5A and FIG. 5B or the embodiment shown in FIG. 17A and FIG. 17B, and details are not described again.

When the RAN is a target RAN, the processor 1501 is configured to execute the program stored in the memory 1502, to implement actions of a target RAN in the embodiments shown in FIG. 2A and FIG. 2B to FIG. 5A and FIG. 5B or the embodiment shown in FIG. 17A and FIG. 17B, and details are not described again.

It should be noted that, in the embodiments shown in FIG. 2A and FIG. 2B to FIG. 5A and FIG. 5B or the embodiment shown in FIG. 17A and FIG. 17B, information between the target RAN and the source RAN may be sent or received by using the communications interface 1504, and information between the source RAN or the target RAN and the CP functional entity may also be sent or received by using the communications interface 1504.

In addition, a message between the UE and a target RAN, for example, a re-establishment request message, may be sent or received by using the transceiver 1503.

Figure 16:
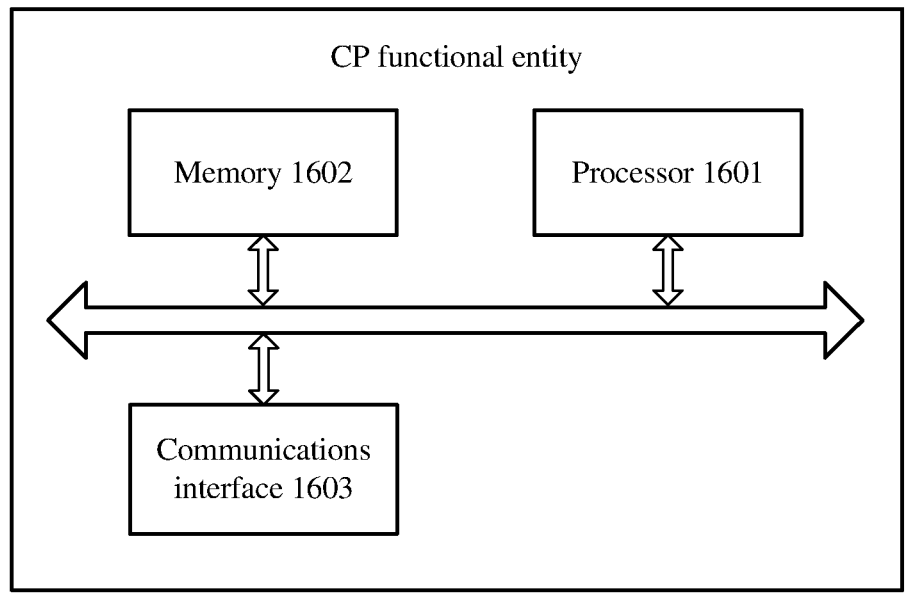
FIG. 16 is a structural diagram of hardware of a CP functional entity according to an embodiment of the present disclosure.

As shown in FIG. 16, an embodiment provides a CP functional entity, specifically including a processor 1601, a memory 1602, and a communications interface 1603.

The memory 1602 is configured to store a program.

The processor 1601 is configured to execute the program stored in the memory 1602, to implement actions of a CP functional entity in the embodiments shown in FIG. 2A and FIG. 2B to FIG. 5A and FIG. 5B, and details are not described again.

It should be noted that, in the embodiments shown in FIG. 2A and FIG. 2B to FIG. 5A and FIG. 5B or the embodiment shown in FIG. 17A and FIG. 17B, information between the CP functional entity and a source RAN or a target RAN may be sent or received by using the communications interface 1603.

In addition, an embodiment provides a system, including UE, a source RAN, a target RAN, and a CP functional entity.

Optionally, in a scenario, the UE is configured to perform actions of UE in the embodiment shown in FIG. 2A and FIG. 2B, the source RAN is configured to perform actions of a source RAN in the embodiment shown in FIG. 2A and FIG. 2B, the target RAN is configured to perform actions of a target RAN in the embodiment shown in FIG. 2A and FIG. 2B, and the CP functional entity is configured to perform actions of a CP functional entity in the embodiment shown in FIG. 2A and FIG. 2B.

Optionally, in another scenario, the UE is configured to perform actions of UE in the embodiment shown in FIG. 3, the source RAN is configured to perform actions of a source RAN in the embodiment shown in FIG. 3, the target RAN is configured to perform actions of a target RAN in the embodiment shown in FIG. 3, and the CP functional entity is configured to perform actions of a CP functional entity in the embodiment shown in FIG. 3.

Optionally, in still another scenario, the UE is configured to perform actions of UE in the embodiment shown in FIG. 5A and FIG. 5B, the source RAN is configured to perform actions of a source RAN in the embodiment shown in FIG. 5A and FIG. 5B, the target RAN is configured to perform actions of a target RAN in the embodiment shown in FIG. 5A and FIG. 5B, and the CP functional entity is configured to perform actions of a CP functional entity in the embodiment shown in FIG. 5A and FIG. 5B.

Optionally, in yet another scenario, the UE is configured to perform actions of UE in an embodiment shown in FIG. 17A and FIG. 17B, the source RAN is configured to perform actions of a source RAN in an embodiment shown in FIG. 17A and FIG. 17B, the target RAN is configured to perform actions of a target RAN in an embodiment shown in FIG. 17A and FIG. 17B, and the CP functional entity is configured to perform actions of a CP functional entity in an embodiment shown in FIG. 17A and FIG. 17B.

As shown in FIG. 17A and FIG. 17B, another link re-establishment method provided in an embodiment of the present disclosure is specifically described as follows.

1701. UE obtains a MAC of UE based on a NAS integrity key and a first MAC generation parameter.

For obtaining of the first MAC generation parameter and the MAC, refer to related descriptions of step 201, and details are not described again.

1702. The UE sends a re-establishment request message to a target RAN, where the re-establishment request message includes the MAC and the first MAC generation parameter. The re-establishment request message may be used to request to re-establish a connection between the UE and the RAN, for example, an RRC connection, and the message may be specifically an RRC connection re-establishment request message.

The re-establishment request message carries a source PCI of the UE. For details, refer to a manner provided in step 202, and details are not described again.

1703. The target RAN receives the re-establishment request message sent by the UE, and sends a first message to a source RAN based on the re-establishment request message.

The first message includes a second MAC generation parameter and the MAC, and the first message may be used to obtain a context of the UE, for example, the first message may be an RLF indication message.

The second MAC generation parameter may be the same as the first MAC generation parameter, or may be different from the first MAC generation parameter.

Specifically, the second MAC generation parameter may include the first MAC generation parameter and a target PCI of the UE, and may be applied to a scenario in which the UE generates the MAC by using the target PCI of the UE, and the first MAC generation parameter does not include the target PCI of the UE. Alternatively, the second MAC generation parameter may be some parameters in the first MAC generation parameter. For example, the second MAC generation parameter may be all parameters in the first MAC generation parameter except the source PCI of the UE, and may be applied to a scenario in which the UE uses the source PCI of the UE to generate the MAC. In other words, when the first MAC generation parameter is an identifier and the source PCI that are of the UE, the second MAC generation parameter is the identifier of the UE, to be specific, the second MAC generation parameter does not include the source PCI of the UE.

In other words, the second MAC generation parameter includes the identifier of the UE, and the second MAC generation parameter may further include at least one of a NAS parameter and an RRC parameter. For the NAS parameter and the RRC parameter, refer to the embodiment shown in FIG. 2A and FIG. 2B, and details are not described again.

It should be noted that, in step 1704, if the target RAN finds at least two RANs based on the source PCI of the UE in the first MAC generation parameter, the first message may be sent to the two RANs. In other words, when the source PCI cannot uniquely identify the source RAN, the target RAN may separately send the first message to a plurality of RANs indicated by the source PCI. In this case, only an RAN storing the identifier of the UE can send a second message to the CP functional entity after receiving the first message. Specifically, when receiving the first message sent by the target RAN, the source RAN may determine, through checking, whether the source RAN stores the identifier of the UE carried in the first message. If the source RAN stores the identifier of the UE carried in the first message, the source RAN sends the second message to the CP functional entity. For details, refer to step 1704.

1704. The source RAN receives the first message sent by the target RAN, and sends a second message to the CP functional entity based on the first message.

The second message includes a third MAC generation parameter and the MAC, and the third MAC generation parameter may be the same as the second MAC generation parameter, or may be different from the second MAC generation parameter. Specifically, the third MAC generation parameter may include all parameters in the second MAC generation parameter except the identifier of the UE. For example, the third MAC generation parameter may be all parameters in the second MAC generation parameter except the identifier of the UE. Apparently, in a scenario in which the source PCI of the UE is used to generate the MAC, when the second MAC generation parameter does not include the source PCI of the UE, the third MAC generation parameter may further include the source PCI of the UE.

Specifically, in an example scenario, in step 1701, the UE obtains the MAC of the UE based on the NAS integrity key and the first MAC generation parameter, and the first MAC generation parameter is an S-TMSI of the UE and the source PCI of the UE; in step 1702, the UE sends the MAC and the first MAC generation parameter to the target RAN; in step 1703, the target RAN sends the MAC and the second MAC generation parameter to the source RAN, and the second MAC generation parameter is the S-TMSI; and in step 1704, the source RAN sends the third MAC generation parameter and the MAC to the CP functional entity, and the third MAC generation parameter is the source PCI of the UE.

In addition, the second message may be sent through a connection link between the source RAN and the CP functional entity, and this is not limited herein.

For specific implementation of step 1704, refer to related descriptions of step 204, and details are not described again.

1705. The CP functional entity receives the second message sent by the source RAN, and verifies the MAC based on the second message.

The second message may be a connection UE change request (Connection UE Verify request).

Specifically, step 1705 may include:

17051. The CP functional entity obtains the NAS integrity key of the UE and the identifier of the UE based on the second message.

Specifically, the CP functional entity may obtain, by using a first link used to receive the second message, the NAS integrity key of the UE and the identifier of the UE. For the first link, refer to the descriptions of step 204.

For example, the CP functional entity receives the second message through the first link, and an MME obtains the identifier of the UE corresponding to the first link, and then the CP functional entity searches for a stored NAS context of the UE based on the identifier of the UE, to obtain the NAS integrity key of the UE.

17052. The CP functional entity verifies the MAC based on the NAS integrity key, the identifier of the UE, and the third MAC generation parameter.

Implementations of steps 17051 and 17052 are similar to those of steps 2051 and 2052, and details are not described again.

In an example scenario of step 1704, in step 17051, the CP functional entity obtains the NAS integrity key of the UE and the S-TMSI of the UE based on the second message; and in step 17052, the CP functional entity verifies the MAC based on the NAS integrity key, the S-TMSI of the UE, and the source PCI of the UE.

A specific verification method is the same as that in step 2052, and details are not described again.

1706. The CP functional entity sends a verification result of the MAC to the source RAN.

1707. The source RAN receives the verification result, sent by the CP functional entity, of the MAC.

1708. When the verification result indicates that verification of the MAC succeeds, the source RAN sends a context of the UE to the target RAN.

The context of the UE in step 1708 may not include an access stratum (AS) security context, for example, a key KeNB*. Specifically, the context may be a context of UE in a control plane CIoT EPS optimization solution. This is not limited herein.

Specifically, the context of the UE may be carried in a restoration UE context response (Retrieve UE Context Response) message.

Optionally, the foregoing step 1708 may further include: sending, by the source RAN, data of the UE stored on the source RAN to the CP functional entity. In this case, the data of the UE may be a NAS PDU that is not sent to the UE.

1709. The target RAN receives the context of the UE sent by the source RAN, and sends a re-establishment response message to the UE.

The re-establishment response message may be specifically an RRC connection re-establishment message.

Apparently, after receiving the re-establishment response message, the UE may send an RRC connection re-establishment complete message to the target RAN. In this case, it should be noted that, for specific implementation of the foregoing steps, and nouns used in the steps, refer to related descriptions in the embodiment shown in FIG. 2A and FIG. 2B, and details are not described again.

In the method provided in the foregoing embodiment, the UE sends, to the target RAN, the re-establishment request message that includes the first MAC generation parameter and the MAC, the target RAN sends the second MAC generation parameter and the MAC to the source RAN by using the first message and based on the re-establishment request message, and the source RAN sends the third MAC generation parameter and the MAC to the CP functional entity based on the first message, so that the CP functional entity verifies the MAC based on the third MAC generation parameter, and sends the verification result to the source RAN. In addition to the advantages of greatly reducing a time consumed by the UE to connect to the target RAN, reducing signaling complexity in re-establishment of a connection by the UE to the CP functional entity, reducing power consumption of the UE, and improving user experience mentioned in the foregoing embodiments, a message length can be reduced by reducing the second MAC generation parameter and the third MAC generation parameter, and load on a communication link can be reduced.

Figure 18:
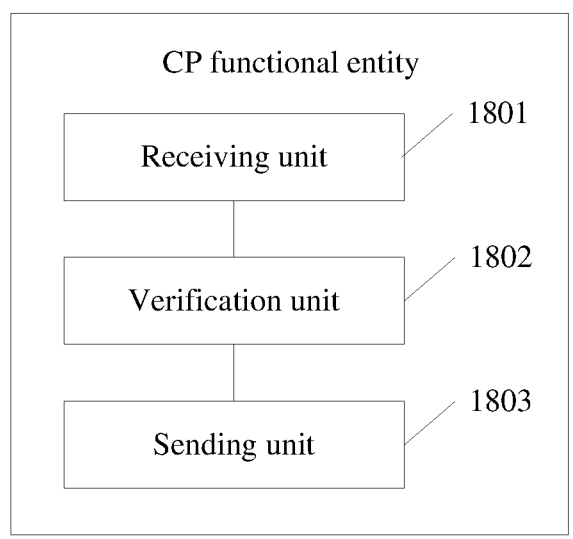
FIG. 18 is a schematic structural diagram of still another CP functional entity according to an embodiment of the present disclosure.

As shown in FIG. 18, an embodiment provides a CP functional entity. The CP functional entity may be configured to perform actions of a CP functional entity in the embodiment shown in FIG. 17A and FIG. 17B, and specifically includes a receiving unit 1801, a verification unit 1802, and a sending unit 1803.

The receiving unit 1801 is configured to receive a second message sent by a source RAN, where the second message includes a MAC of UE and a third MAC generation parameter.

The verification unit 1802 is configured to verify the MAC based on the second message received by the receiving unit 1801.

The sending unit 1803 is configured to send a verification result of the MAC to the source RAN.

The third MAC generation parameter includes at least one of a NAS parameter and an RRC parameter. For the RRC parameter and the NAS parameter, refer to related descriptions in the embodiment shown in FIG. 2A and FIG. 2B.

Specifically, the third MAC generation parameter may be the same as the foregoing second MAC generation parameter, or may be different from the foregoing second MAC generation parameter.

Optionally, the verification unit 1802 may be configured to perform steps 17051 and 17052, and is specifically configured to: obtain a NAS integrity key of the UE and an identifier of the UE based on the second message; and verify the MAC based on the NAS integrity key, the identifier of the UE, and the third MAC generation parameter.

Optionally, the third MAC generation parameter may further include the identifier of the UE. In this case, the verification unit 1802 may be configured to perform steps 2051 and 2052, and details are not described again.

For manners of sending the NAS parameter, the RRC parameter, the second MAC generation parameter, the identifier of the UE, the second message, and the verification result of the MAC, refer to related descriptions in the embodiment shown in FIG. 2A and FIG. 2B, and details are not described herein again.

Optionally, in an implementation scenario of the foregoing embodiment, the receiving unit 1801 is further configured to receive data of the UE sent by the source RAN; and the sending unit 1803 is further configured to send the data of the UE to the target RAN.

The CP functional entity provided in the foregoing embodiment verifies the MAC based on the third MAC generation parameter, sends the verification result to the source RAN, and triggers the source RAN to send the context of the UE to the target RAN. Therefore, the target RAN successfully obtains the context of the UE before establishment of an RRC connection is completed, and the UE does not need to initiate a TAU procedure to connect to the target RAN. This greatly reduces a time consumed by the UE to connect to the target RAN, reduces signaling complexity in re-establishment of a connection by the UE to the CP functional entity, reduces power consumption of the UE, and improves user experience. In addition, the CP functional entity verifies integrity of the MAC, to implement validity verification on a re-establishment request message. This prevents the re-establishment request message from being forged, tampered, or replayed, and ensures network security.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that, the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

The invention claimed is:

1. A communication method carried out by a control plane (CP) functional entity, the method comprising:
 receiving, from a target radio access node (RAN), a first message that comprises a non-access stratum (NAS) parameter and a message authentication code (MAC);
 verifying the MAC based on the NAS parameter; and
 sending, in accordance with successfully verifying the MAC, a second message to a source RAN,
 wherein the second message is used to request the source RAN to send an undelivered NAS packet data unit (PDU) of a user equipment (UE) to the CP functional entity.

2. The communication method according to claim 1, further comprising:
 receiving, from the source RAN, the undelivered NAS PDU of the UE, and
 sending the NAS PDU to the target RAN.

3. The communication method according to claim 1, further comprising:
requesting the source RAN to delete a context of the UE.

4. The communication method according to claim 1, further comprising:
sending a context of the UE to the target RAN.

5. The communication method according to claim 4, wherein the context of the UE comprises at least one of the group consisting of:
a mobility management entity (MME) UE S1 application protocol (S1AP) ID; and
an E-UTRAN radio access bearer level quality of service parameter.

6. The communication method according to claim 1, wherein the NAS parameter comprises a partial field of a NAS count.

7. A communication apparatus comprising:
a transceiver;
at least one processor; and
one or more memories coupled to the at least one processor and storing programming instructions for execution by the at least one processor to cause the communication apparatus to carry out a method comprising:
receiving, from a target radio access node (RAN), a first message that comprises a non-access stratum (NAS) parameter and a message authentication code (MAC);
verifying the MAC based on the NAS parameter; and
sending, in accordance with successfully verifying the MAC, a second message to a source RAN,
wherein the second message is used to request the source RAN to send an undelivered NAS packet data unit (PDU) of a user equipment (UE) to the CP functional entity.

8. The communication apparatus according to claim 7, wherein the method further comprises:
receiving, from the source RAN, the undelivered NAS PDU of the UE, and
sending the NAS PDU to the target RAN.

9. The communication apparatus according to claim 7, wherein the method further comprises:
requesting the source RAN to delete a context of the UE.

10. The communication apparatus according to claim 7, wherein the method further comprises:
sending a context of the UE to the target RAN.

11. The communication apparatus according to claim 10, wherein the context of the UE comprises at least one of the group consisting of:
a mobility management entity (MME) UE S1 application protocol (S1AP) ID; and
an E-UTRAN radio access bearer level quality of service parameter.

12. The communication apparatus according to claim 7, wherein the NAS parameter comprises a partial field of a NAS count.

13. A communication method, the method comprising:
receiving, by a control plane (CP) functional entity, from a target radio access node (RAN), a first message that comprises a non-access stratum (NAS) parameter and a message authentication code (MAC);
verifying, by the CP functional entity, the MAC based on the NAS parameter; and
sending, by the CP functional entity, in accordance with successfully verifying the MAC, a second message to a source RAN, wherein the second message is used to request the source RAN to send an undelivered NAS packet data unit (PDU) of a user equipment (UE) to the CP functional entity;
receiving, by the source RAN, the second message;
sending, by the source RAN, in response to receiving the second message, an undelivered NAS PDU of the UE to the CP functional entity;
receiving, by the CP functional entity, from the source RAN, the undelivered NAS PDU of the UE, and
sending, by the CP functional entity, the NAS PDU via the target RAN to the UE.

14. The communication method according to claim 13, further comprising:
requesting, by the CP functional entity, the source RAN to delete a context of the UE;
deleting, by the source RAN, the context of the UE, in response to the requesting from the CP functional entity.

15. The communication method according to claim 13, further comprising:
sending, by the CP functional entity, a context of the UE to the target RAN.

16. A communication system comprising:
a control plane (CP) functional entity, and
a source RAN,
wherein the CP functional entity is configured to:
receive from a target radio access node (RAN), a first message that comprises a non-access stratum (NAS) parameter and a message authentication code (MAC);
verify the MAC based on the NAS parameter; and
send in accordance with successfully verifying the MAC, a second message to a source RAN, wherein the second message is used to request the source RAN to send an undelivered NAS packet data unit (PDU) of a user equipment (UE) to the CP functional entity; and
wherein the source RAN is configured to:
receive the second message, and
send in response to receiving the second message, an undelivered NAS PDU of the UE to the CP functional entity; and
wherein the CP functional entity is further configured to:
receive from the source RAN, the undelivered NAS PDU of the UE, and
send the NAS PDU via the target RAN to the UE.

17. The communication system according to claim 16, wherein CP functional entity is further configured to:
request the source RAN to delete a context of the UE; and
wherein the source RAN is further configured to: delete the context of the UE, in response to the requesting from the CP functional entity.

18. The communication system according to claim 17, further comprising:
wherein CP functional entity is further configured to: send a context of the UE to the target RAN.

* * * * *